US012495777B2

(12) United States Patent
Badeaux

(10) Patent No.: US 12,495,777 B2
(45) Date of Patent: Dec. 16, 2025

(54) DUAL LINE CAST NET RETRIEVAL DEVICE

(71) Applicant: Christopher A. Badeaux, Luling, LA (US)

(72) Inventor: Christopher A. Badeaux, Luling, LA (US)

(*) Notice: Subject to any disclaimer, the term of this patent is extended or adjusted under 35 U.S.C. 154(b) by 0 days.

(21) Appl. No.: 18/824,717

(22) Filed: Sep. 4, 2024

(65) Prior Publication Data

US 2025/0204503 A1 Jun. 26, 2025

(51) Int. Cl.
*A01K 75/00* (2006.01)

(52) U.S. Cl.
CPC ................... *A01K 75/00* (2013.01)

(58) Field of Classification Search
USPC .......................................... 43/7, 8
See application file for complete search history.

(56) References Cited

U.S. PATENT DOCUMENTS

| | | | | |
|---|---|---|---|---|
| 8,161,676 B1 * | 4/2012 | Beach | ................ | A01K 74/00 43/7 |
| 10,638,737 B2 * | 5/2020 | Dominguez | ........... | A01K 75/00 |
| 10,712,130 B2 * | 7/2020 | Leimbach | ................ | F41H 13/00 |
| 2004/0200119 A1 * | 10/2004 | Ardern | .................... | A01K 73/00 43/8 |
| 2016/0205905 A1 * | 7/2016 | Souther | .................. | A01K 74/00 |

* cited by examiner

*Primary Examiner* — Joshua J Michener
*Assistant Examiner* — Henry Hooper Mudd
(74) *Attorney, Agent, or Firm* — Taylor M. Norton; Norton IP Law Firm LLC

(57) ABSTRACT

A dual line cast net retrieving device is disclosed having a cast net body with a central horn connected to a net webbing, to be thrown into a water body for fishing. The cast net retrieving device includes a hand line that is operatively connected to a swivel of the cast net body, and a horn line that is connected in parallel to the hand line through a plurality of couplers. The horn line is removably connected to the central horn of the cast net body. A pulling of the horn line through the plurality of couplers exerts a pulling force upon the central horn, which alleviates tension in the braille lines of the cast net thereby allowing a user to remove the cast net from being snagged on an underwater obstruction, while avoiding breakage of the braille lines and without the user needing to enter the water.

12 Claims, 26 Drawing Sheets

DUAL LINE CAST NET RETRIEVAL DEVICE

BACKGROUND OF THE INVENTION

Field of the Invention

The present disclosure relates generally to fishing nets and, more particularly, to cast net retrieving devices facilitating retrieval of cast nets snagged upon underwater obstructions by users without users having to enter the water.

Description of the Related Art

Cast nets have been a staple tool for fishermen for centuries. Their simplicity and effectiveness make them a popular choice for catching baitfish and small fish in shallow waters. A well-thrown cast net spreads out like a large, circular curtain, blanketing an area of water, and trapping fish underneath. The retrieval process is straightforward in ideal situations: where a user simply pulls a hand line, which pulls the braille lines through the central horn and cinched the lead line at the bottom of the net closed, at which point the user pulls the cast net and respective catch to the surface and out of the water. However, a common challenge arises when retrieving the net, particularly when it becomes snagged on underwater obstructions in the water.

Snags can occur for a variety of reasons. Uneven bottoms with rocks, vegetation, or debris can snag the weighted edge of the net, preventing it from closing properly. Underwater obstacles, such as broken pilings often cause a cast net to be snagged and potentially tear when the user pull on the hand line when trying to retrieve the cast net.

When a cast net becomes snagged, the traditional retrieval methods often come with drawbacks. The most common approach is for the user to simply pull harder on the hand line. This can be effective for minor snags, but with a firmly lodged net, it can lead to hand line breakage, braille line breakage, or damage to the net itself. Most often, a user resorts to wading or even swimming into the water to free the net from the underwater obstruction. This can be inconvenient, time-consuming, and even dangerous depending on the depth of the water, the current conditions, or the user's physical capabilities. Cold water, strong currents, or slippery rocks can all pose significant safety hazards. Additionally, murky or deep water can make it very difficult to locate the snag and thus very difficult to effectively free the net from the underwater obstruction. Dealing with snagged cast nets also amounts to lost fishing time while out over the water.

Moreover, when snagged cast nests are not able to be retrieved from the underwater obstructions, then the cast nets are left in the water and pose a danger to the local wildlife and habitat.

The limitations of traditional retrieval devices and methods highlight the need for a more user-friendly and safer way to handle and retrieve snagged cast nets. There is a need for cast net retrieving devices and methods that allows users to free a snagged net from an underwater obstruction without having to enter the water. There is a need for a cast net retrieving device that also minimizes the risk of line breakage or net damage during retrieval of a snagged cast net.

SUMMARY OF THE INVENTION

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a cast net retrieving device is disclosed. The cast net retrieving device comprises a cast net body having a central horn connected to a net webbing having a weighted lead line at a distal end thereof. The cast net body is adapted to be thrown by a user into a water body for fishing.

In one embodiment, the cast net retrieving device comprises a hand line, a horn line, and a plurality of couplers. The hand line has a proximal end opposite a distal end, and the distal end is operatively connected to a swivel. The swivel is connected to a plurality of braille lines slidably extending through the central horn of the cast net body. The plurality of braille lines have respective distal ends which are connected to the weighted lead line.

The horn line having a proximal end opposite a distal end, is operatively connected to the hand line through the plurality of couplers. At least one coupler of the plurality of couplers defines a line retainer and defines a line passageway adjacent the line retainer. The line retainer is fixed to a portion of the hand line extending therethrough, the line passageway operatively slidably receiving the horn line therethrough in a sliding engagement. The distal end of the horn line is connected to the central horn of the cast net body. The horn line is adapted to exert an uplifting force upon the central horn and the connected net webbing, upon a horn line pulling by the user through the plurality of couplers. The uplifting force is configured to alleviate tension in the braille lines when the weighted lead line and/or net webbing is snagged upon an underwater obstruction.

According to another preferred embodiment consistent with the present disclosure, the cast net retrieving device comprises a hand line and a horn line.

The hand line has a proximal end opposite a distal end. The distal end of the hand line is adapted to removably connect to a swivel of a cast net, where the swivel is operatively connected to a plurality of braille lines that slidably extend through a central horn of the cast net body. The plurality of braille lines have respective distal ends connected to a weighted lead line at the bottom end of the net webbing of the cast net.

The horn line has a proximal end opposite a distal end. The horn line is operatively connected to the hand line through a plurality of couplers. In a preferred embodiment, at least one coupler of the plurality of couplers defines a line retainer and also defines a line passageway adjacent the line retainer. The line retainer is fixed to a portion of the hand line extending therethrough. The line passageway operatively and slidably receives the horn line therethrough in a sliding engagement.

In one embodiment, the distal end of the horn line is adapted to connect to the central horn of the cast net body. The horn line is adapted to exert an uplifting force upon the central horn and the connected net webbing, at the option of a user, upon a horn line pulling by the user through the plurality of couplers. The uplifting force upon the horn line is configured to alleviate tension in the braille lines when the weighted lead line is snagged upon an underwater obstruction.

According to another embodiment consistent with the present disclosure, the cast net retrieving device comprises the cast net body having a central horn connected to the net webbing. The net webbing has a weighted lead line at a distal end thereof. The cast net body is adapted to be thrown by a user into a water body for fishing.

In some embodiments, the cast net retrieving device comprises a hand line, a horn line, and a horn hook.

The hand line has a proximal end opposite a distal end. The distal end is operatively connected to a swivel of the cast net body. The swivel is connected to a plurality of braille lines slidably extending through the central horn of the cast net body. The plurality of braille lines have respective distal ends that are connected to the weighted lead line, at the bottom of the net webbing.

In one embodiment, the horn hook includes an elongated member having a first end opposite a second end. The first end of the horn hook defines an eyelet, and the horn line is connected to the eyelet. The second end of the horn hook comprises a hook.

In a preferred embodiment, the horn hook includes a hollow member that is formed adjacent to the elongated member. The hollow member is adapted to slidingly receive the hand line therethrough.

The hook of the horn hook is adapted to slidingly engage and removably connect to the central horn of the cast net body upon a deployment of the horn hook along the hand line. The hand line is allowed to pass through the hollow member of the horn hook upon such deployment, such that the hook removably connects to the central horn of the cast net body.

In a preferred embodiment, the horn line is removably connected to the eyelet of the first end of the elongated member of the horn hook. When the hook of the horn hook is connected to a central horn of a cast nest body, the horn line is adapted to exert an uplifting force upon the central horn and the connected net webbing, at the option of the user, upon a horn line pulling by the user when the hook is removably connected to the central horn. Such uplifting force is configured to alleviate tension in the braille lines when the weighted lead line and/or net webbing is snagged upon an underwater obstruction, thereby facilitating removal of the cast net from the underwater obstruction during a retrieval of the cast net by the user.

According to another embodiment consistent with the present disclosure, the cast net retrieving device comprises a horn hook. The horn hook comprises an elongated member having a first end opposite a second end. The first end defines an eyelet, to which a horn line is removably connected, and the second end comprises a hook. The horn hook preferably includes a hollow member that is formed adjacent to the elongated member. The hollow member is adapted to slidingly receive a hand line therethrough. The hook is adapted to slidingly engage and removably connect to a central horn of a cast net body upon a deployment of the horn hook along the hand line. The hand line is allowed to pass through the hollow member of the horn hook. Preferably, the horn line is removably connected to the eyelet of the first end of the elongated member of the horn hook. After a deployment of the horn hook along the hand line down to the central horn of a cast net body, the hook of the horn hook is removably connected to the central horn of the cast net body, such that the horn line is adapted to exert an uplifting force upon the central horn of the cast net body and the respective net webbing attached to the central horn, upon a horn line pulling by a user, when said hook is removably connected to the central horn.

According to another embodiment consistent with the present disclosure, the cast net retrieving device includes a cast net body, a hand line, a tube joint embedded within the hand line, and a horn line operatively disposed within the tube joint. The horn line extends out of each end of the tube joint.

The cast net body includes a central horn connected to a net webbing. The net webbing has a weighted lead line at a distal end thereof. The cast net body is adapted to be thrown by a user into a water body for fishing.

The hand line has a proximal end opposite a distal end. Preferably, the distal end is removably connected to a swivel of the cast net body. The swivel is operatively connected to a plurality of braille lines slidably extending through the central horn of the cast net body. The plurality of braille lines have respective distal ends that are connected to the weighted lead line.

In a preferred embodiment, the cast net retrieving device includes the tube joint tightly embedded within the hand line. The tube joint has a proximal end positioned at a first aperture defined by a proximal end of the hand line. The tube joint has a distal end positioned at a second aperture defined by a distal end of the hand line.

The horn line has a proximal end opposite a distal end. In a preferred embodiment the horn line is operatively disposed within the tube joint. The proximal end of the horn line extends outwardly from the tube joint at the first aperture. The distal end of the horn line extends outward of the tube joint at the second aperture, and the distal end of the horn line is removably connected to the central horn of the cast net body.

The horn line is adapted to exert an uplifting force upon the central horn and the connected net webbing, upon a horn line pulling by the user through the tube joint and respective hand line. The uplifting force is configured to alleviate tension in the braille lines when the weighted lead line and/or net webbing is snagged upon an underwater obstruction.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1A:
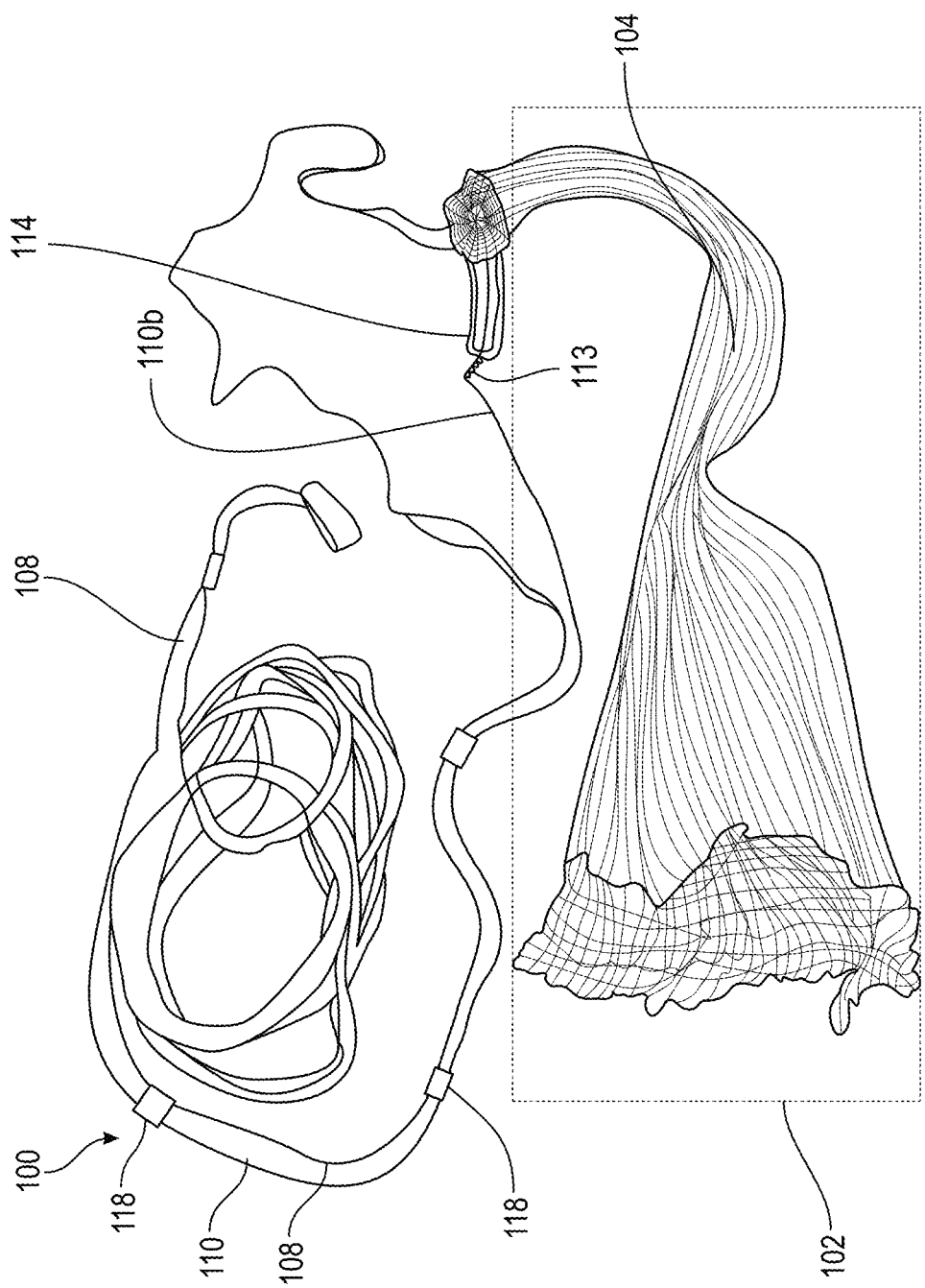
FIGS. 1A-1E are perspective views of a cast net retrieving device comprising a dual line cast net retrieving device, in accordance with embodiments of the invention.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to fishing nets. Herein, cast net retrieving devices are disclosed that allow users to free a snagged cast net without the user having to enter into the water, while avoiding breakage of the braille lines of the cast net, regardless of water conditions.

As can appreciated from this detailed disclosure, include the Figures and appended claims, one of ordinary skill in the art could appreciate that the embodiments of the disclosed inventions herein also enable a fisherman to release a catch, such as an alligator, that would otherwise break the cast net, without the user having to enter into the water, while avoiding breakage of the braille lines of the cast net.

Figure 1B:
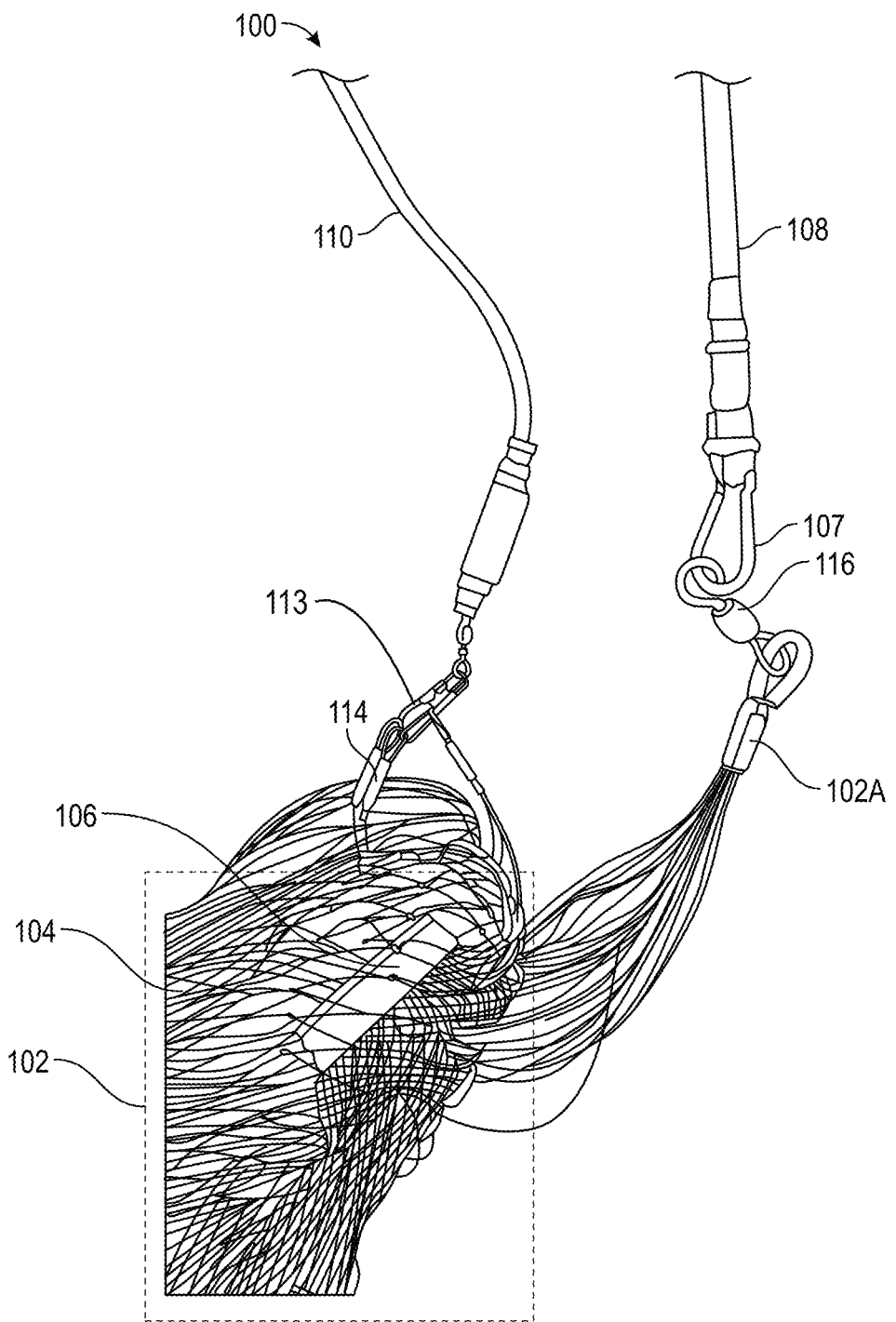
Figure 1C:
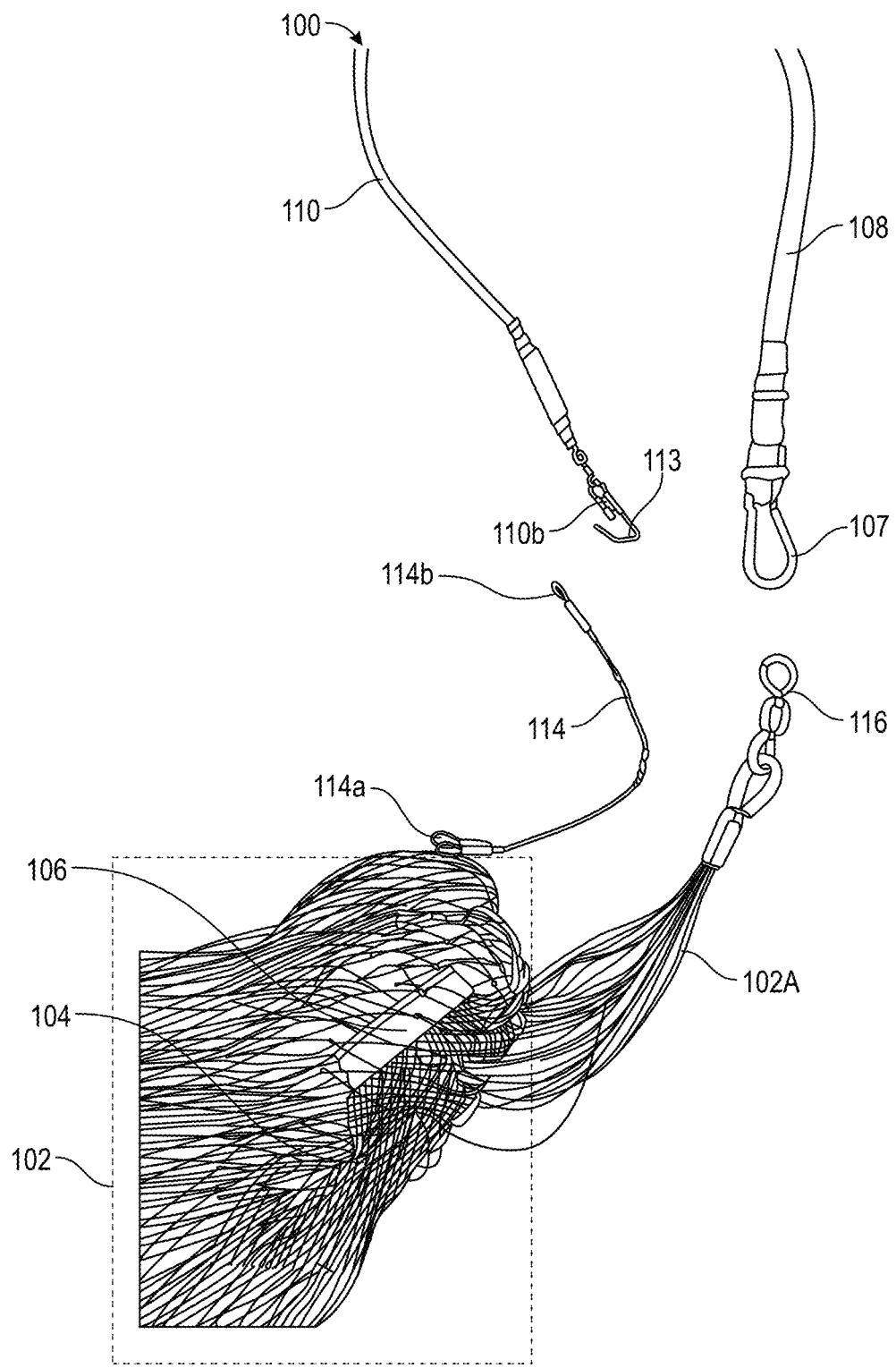
Figure 1D:
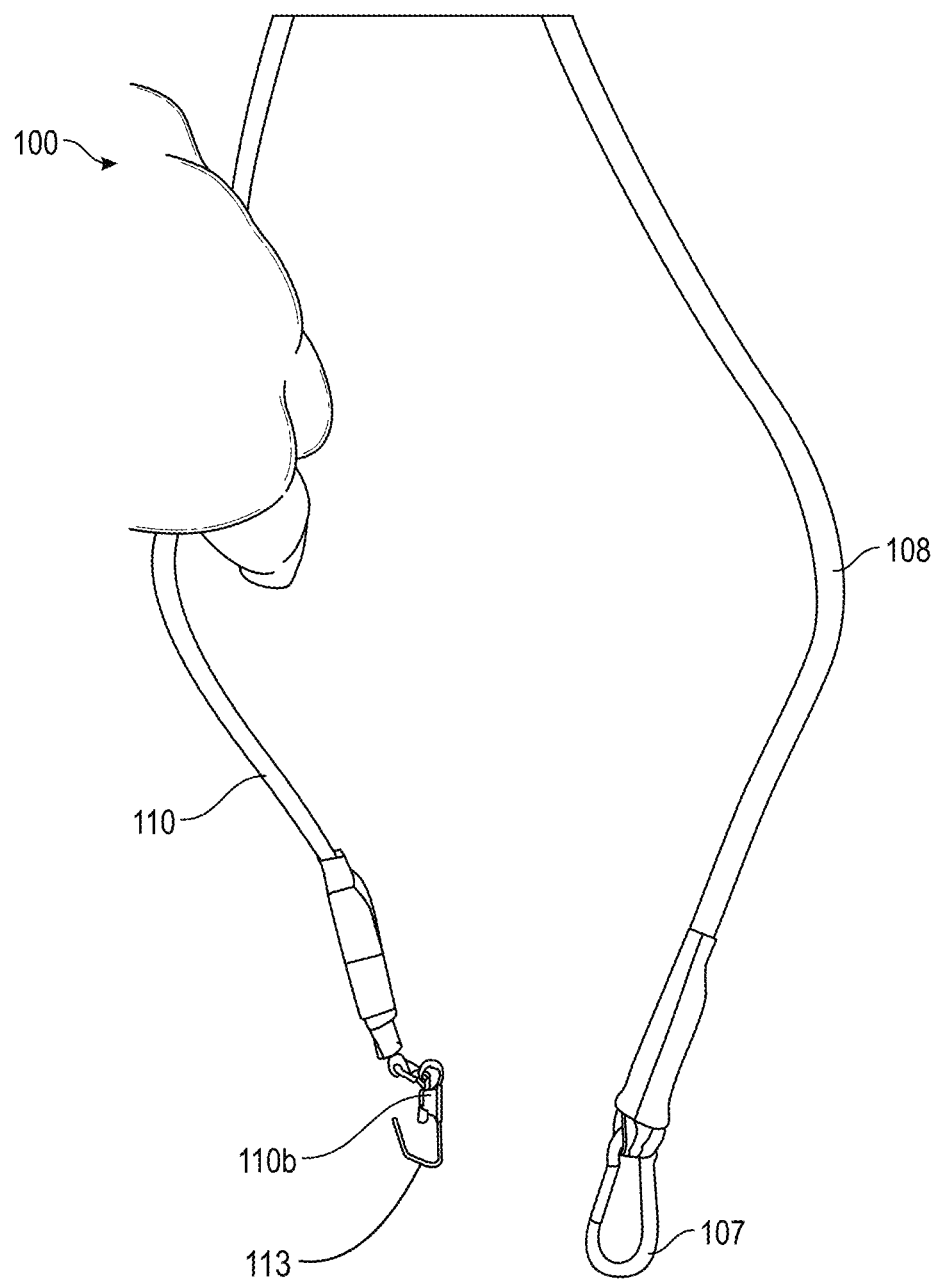
Figure 1E:
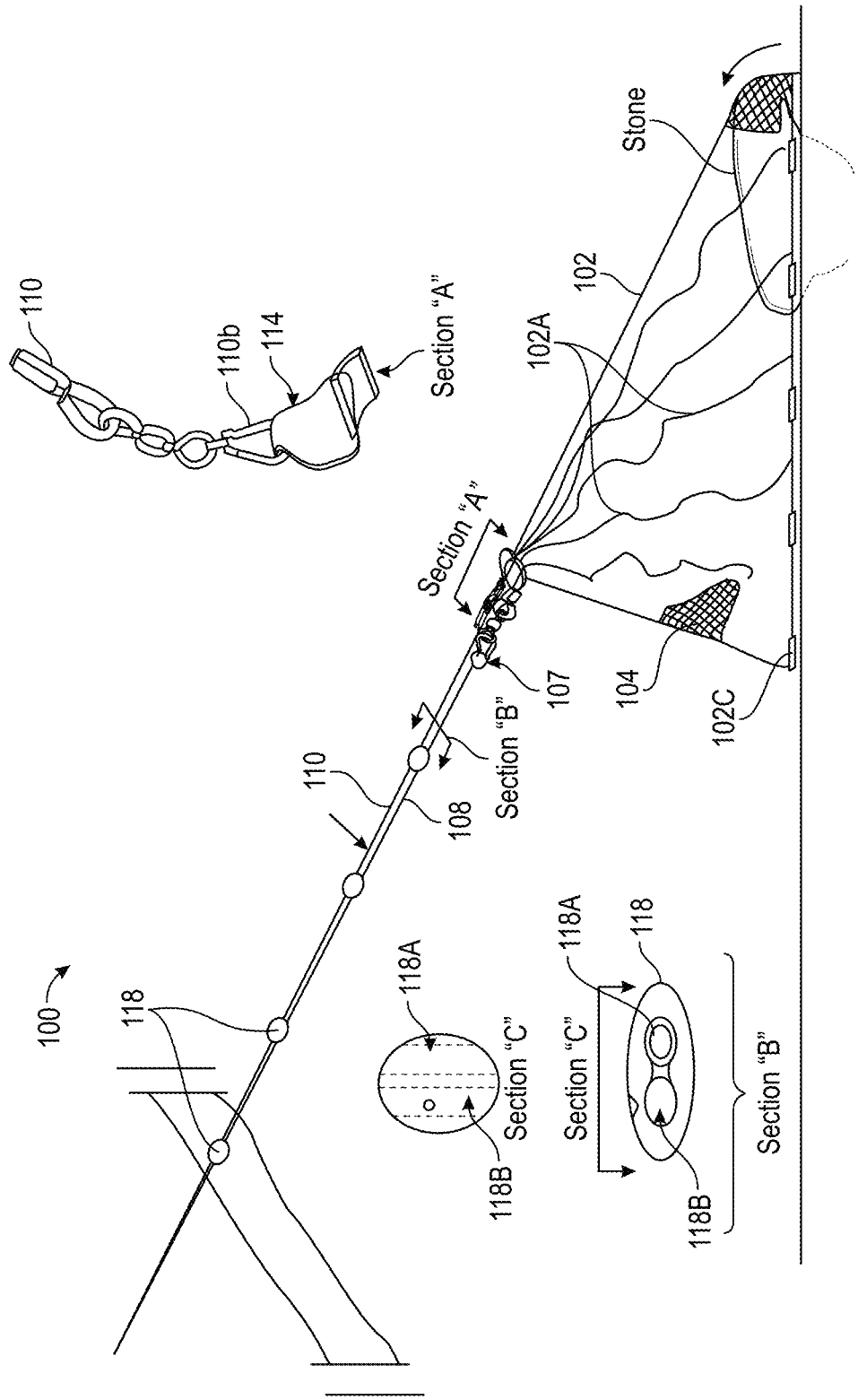
Figure 1F:
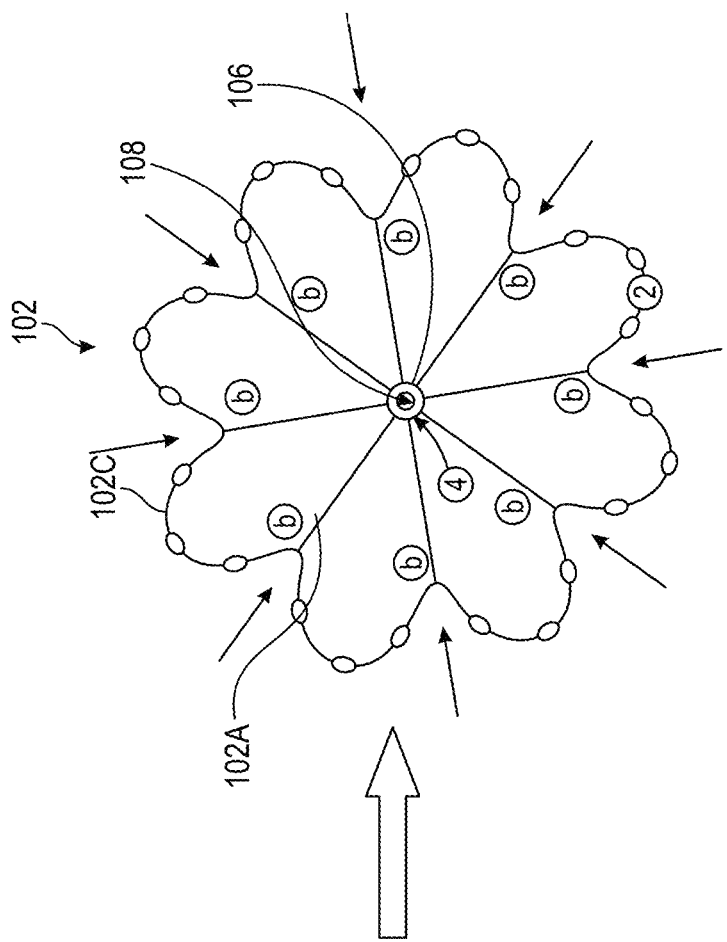
FIG. 1F illustrates an example view of the cast net body in relation with the snag, in accordance with embodiments of the invention.
Figure 1F:
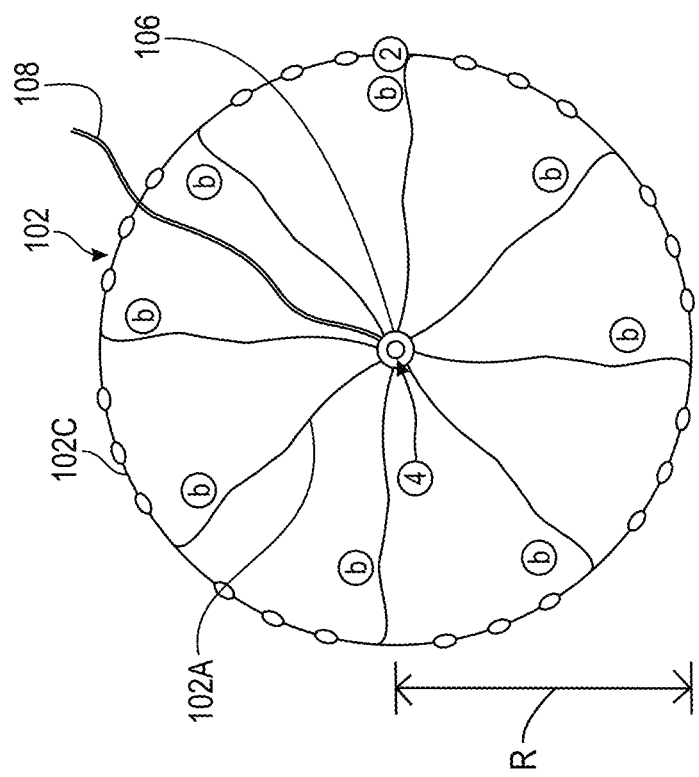
Figure 1G:
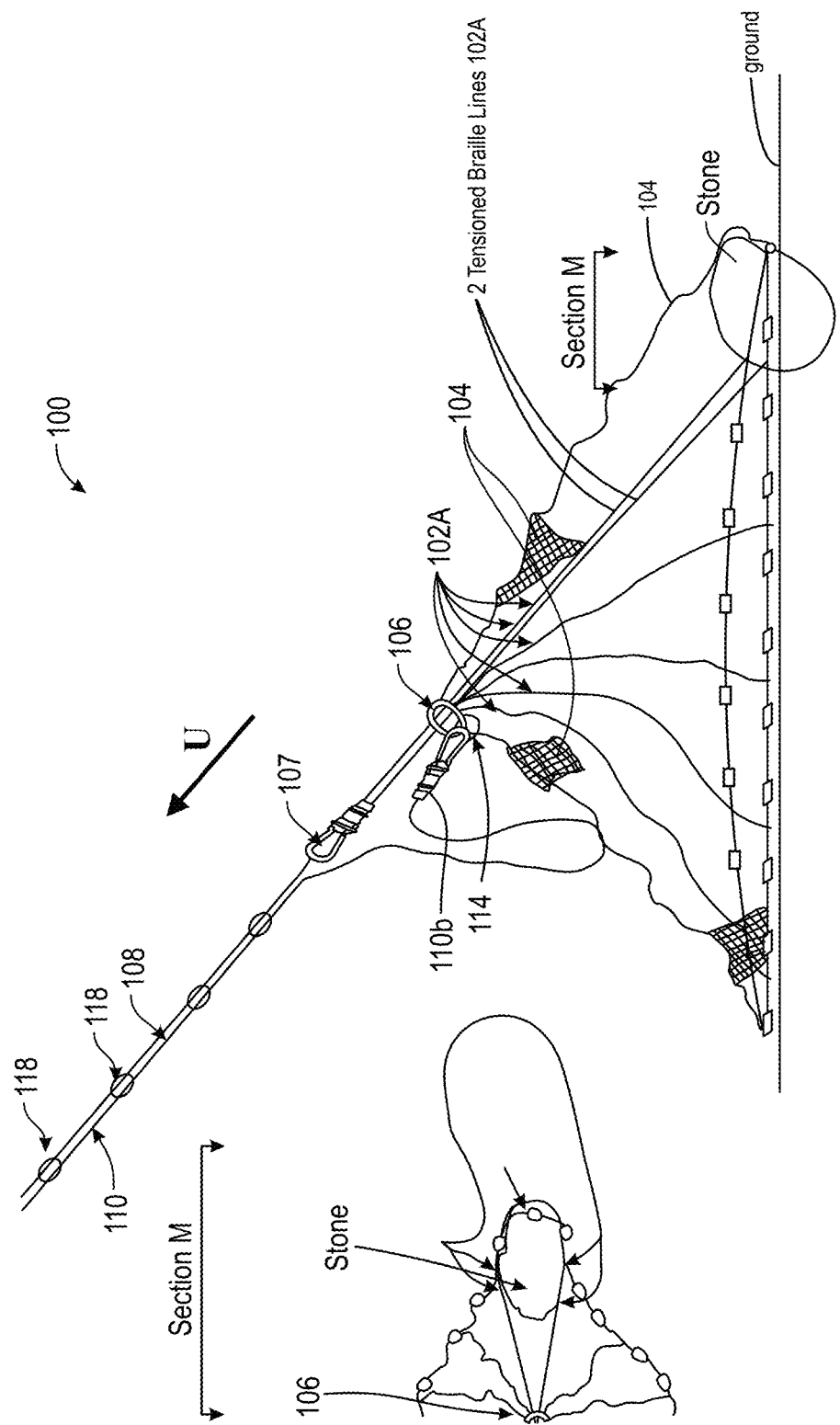
FIG. 1G illustrates an example scenario where the cast net retrieving device with the horn line and coupler assembly encounters a snag, in accordance with embodiments of the invention.

Referring to FIGS. 1A to 1E, a cast net retrieving device 100 is disclosed comprising a cast net body 102 having a central horn 106 connected to a net webbing 104. The central horn 106 has an opening 106a. The net webbing 104 has a weighted lead line at a distal end thereof. The cast net body 102 is adapted to be thrown by a user into a water body for fishing. The cast net body 102 further comprises a lead line 102C with a plurality of weights, as illustrated in FIGS. 1E-1G.

In one embodiment, the cast net retrieving device 100 comprises a hand line 108, a horn line 110, and a plurality of couplers 118. The disclosed cast net retrieval device is a dual line device.

The hand line 108 has a proximal end 108a opposite a distal end 108b. The distal end 108b is removably connected to, or adapted to connect to, a swivel 116 of the cast net body 102, as seen in FIGS. 1B-1D. The swivel 116 is connected to the plurality of braille lines 102A that slidably extend through the central horn 106 of the cast net body 102. The braille lines 102A have respective distal ends connected to the weighted lead line 102C, as illustrated in FIGS. 1E-1G.

Referring to FIGS. 1B-1D, in a preferred embodiment, the hand line 108 is configured with a spring-loaded hook 107 that removably connects the hand line 108 to the swivel 116. Respective proximal ends of the plurality of braille lines 102A are connected to the swivel 116.

The horn line 110 has a proximal end 110a opposite a distal end 110b, and in a preferred embodiment, the horn line 110 is operatively connected to the hand line 108 through the plurality of couplers 118, as illustrated in FIG. 1E and FIGS. 1G-1K.

Figure 1H:
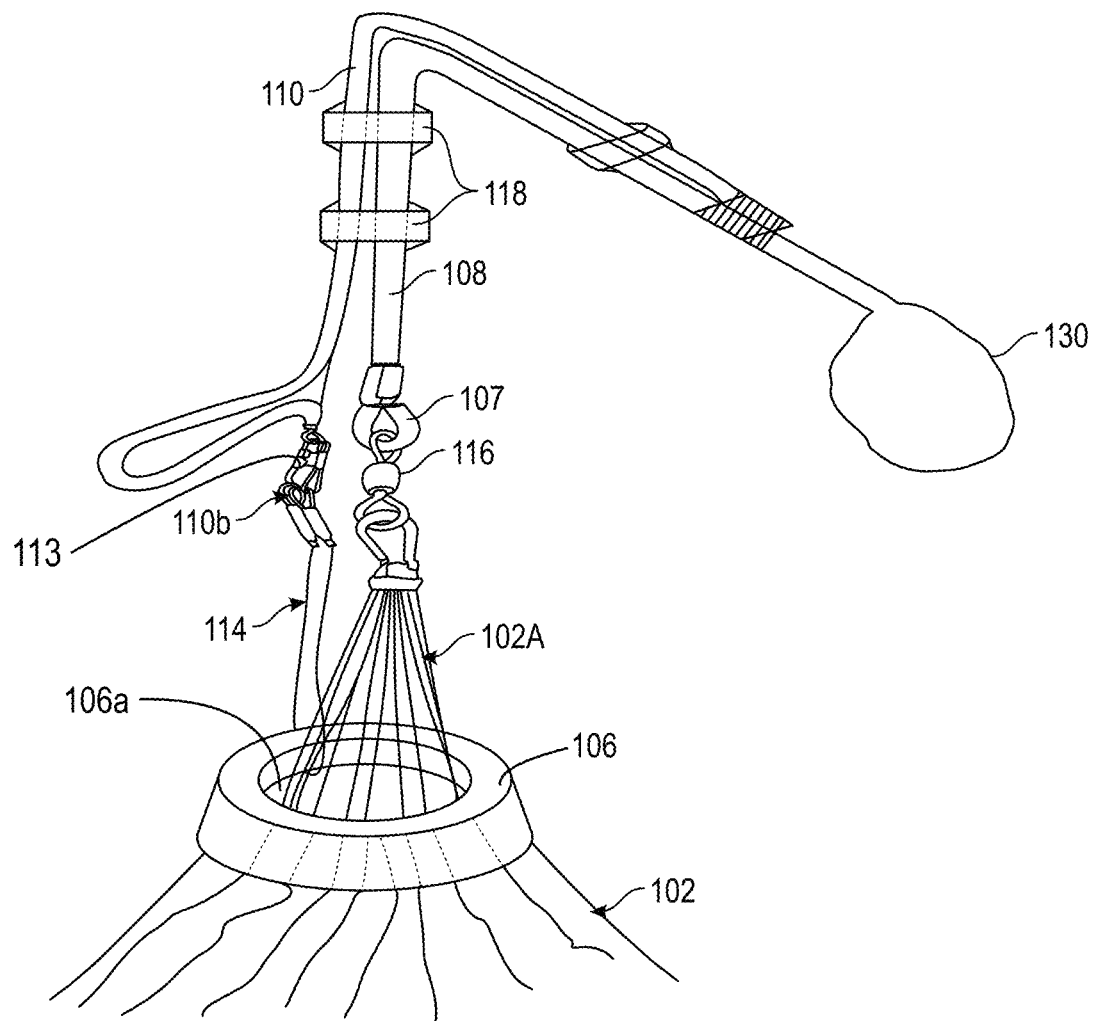
FIG. 1H illustrates a detailed view of the cast net retrieving device with the horn line and coupler assembly in accordance with embodiments of the invention.
Figure 1I:
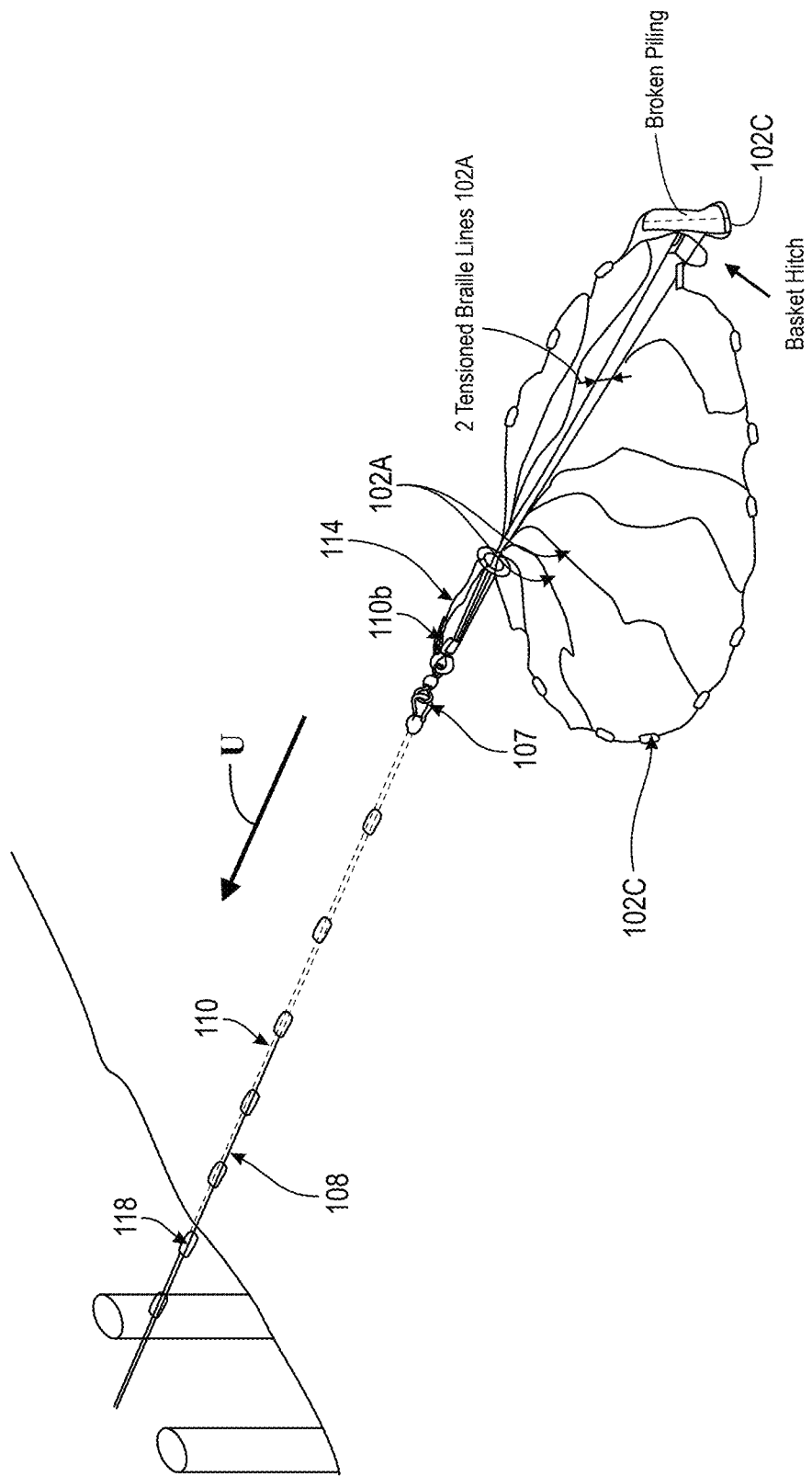
FIG. 1I illustrates an example operation of the cast net retrieving device with the horn line and coupler assembly, in accordance with embodiments of the invention.
Figure 1J:
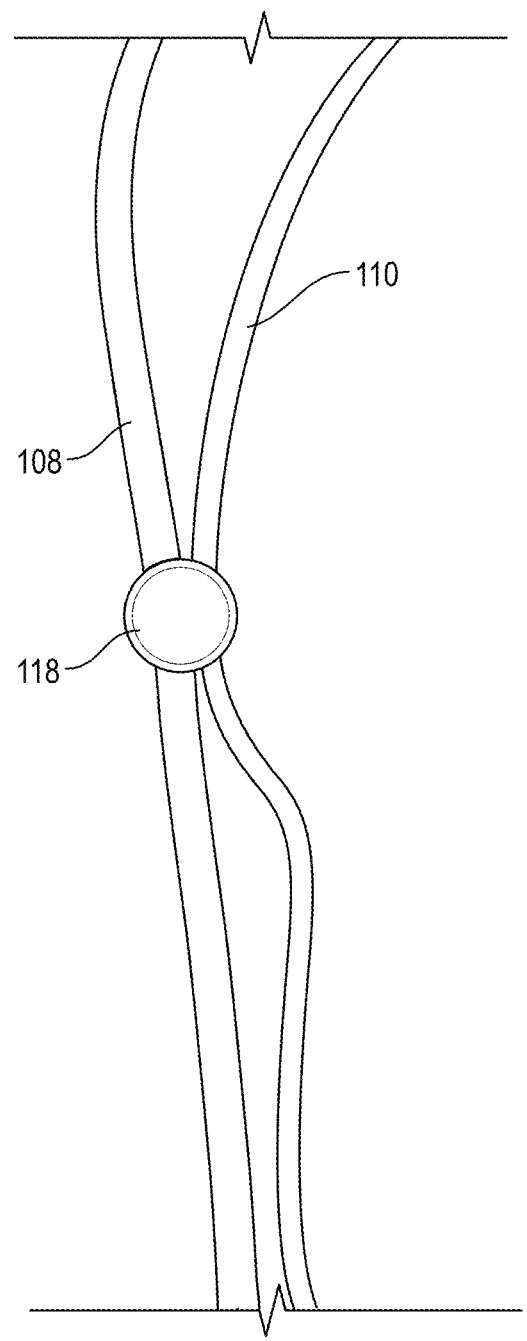
FIG. 1J illustrates a schematic view of connection assembly of the hand line and the horn line using the coupler, in accordance with embodiments of the invention.
Figure 1K:
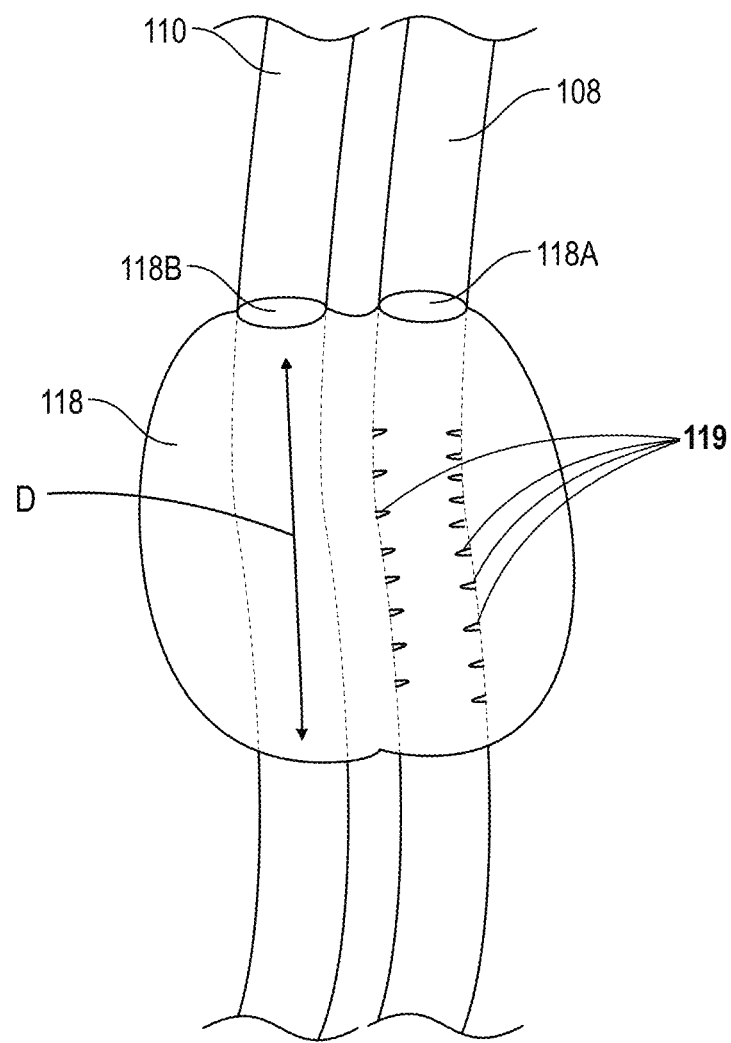
FIG. 1K illustrates a schematic design of the coupler, in accordance with embodiments of the invention.

Referring to FIGS. 1J-1K, preferably, at least one coupler 188 of the plurality of couplers defines a line retainer 118a and also defines a line passageway 118b adjacent to the line retainer 118a. The line retainer 118a is preferably fixed to a portion 109 of the hand line 108, that extends therethrough and outwardly each end thereof. In other words, the line retainer 118a is connected to a portion 109 of the hand line 108 at a fixed position.

The line passageway 118b of the at least one coupler operatively slidably received the horn line 110 therethrough in a sliding engagement. In other words, respective portions 109 (109a, 109b, 109c, etc) of the hand line 108 are respectively fixed inside each of the plurality of couplers 118, and the horn line 110 slides through the plurality of couplers 118 when pulled upon by a user.

In one embodiment, a length of the horn line 110 is at least 1 foot greater than a length of the hand line 108. In yet another embodiment, a length of the horn line 110 is at least 4 feet greater than a length of the hand line 108, as illustrated in FIGS. 1A, 1G, and 1H.

In a preferred embodiment, a preferred length of the horn line 110 is longer than a length of the hand line 108 by a length that is equal to (or longer than) a length of a radius (R) of the cast net, as illustrated in FIG. 1F. For example, a 6-foot cast net can a radius (R) of 6 feet, which is the distance from the central horn 106 to the lead line 102C. When opened, the net will unfold into a circle that is 12 feet across in diameter, which is twice the radius (R). Thus, in this example, in a preferred embodiment, a length of the horn line 110 is longer than a length of the hand line 108 by a length that is equal to 6 feet, because that is the length of the radius of the cast net, in this illustrative example.

In a preferred embodiment, the distal end 110b of the horn line 110 is connected to the central horn 106 of the cast net body 102, as illustrated in FIGS. 1A-1C. In a preferred embodiment, the horn line 110 is connected to the central horn 106 through a basket hitch connector 114. The basket hitch connector 114 forms a loop around the central horn, and ends of the basket hitch connector 114 are connected to a horn line clasp 113 of the horn line 110, as exemplified in FIG. 1B.

The horn line 110 is removably connected to, and also adapted to removably connect to, the central horn 106 of a cast net through a basket hitch connector 114, as illustrated in FIG. 1C and FIG. 1H. The basket hitch connector 114 is disposed at a distal end of the horn line 110. The basket hitch connector 114 forms a loop around the central horn 106 via the opening 106a, and the respective ends 114a, 114b of the basket hitch connector 114 are each connected to a horn line clasp 113 which is removably connected to the distal end 110b of the horn line 110.

The horn line 110 is adapted to exert an uplifting force upon the central horn 106 and the connected net webbing 104, at the option of the user, upon a horn line 110 pulling by the user of the horn line 110 through the couplers 118. The uplifting force is configured to alleviate tension in the braille lines 102A when the weighted lead line 102C and net webbing 104 is snagged upon an underwater obstruction, such as a broken piling.

Referring to FIG. 1E and FIG. 1G, it can be seen that the horn line 110 is pulled by a user in the direction of Arrow U to remove the cast net body 102 from an underwater obstruction, as further described and detailed herein. When the horn line 110 is pulled by a user, the couplers 118 allow the horn line 110 to freely move inside the couplers and provide control over the central horn 106, in order to raise the cast net body 102 upwards, off of the underwater obstruction. The upward pulling upon the central horn 106 allows the braille lines 102A to relax as the tension is released from the braille lines 102A, which enables the net webbing 104 and lead line 102C to slide off from the snag, which allows the cast net body 102 to be raised upwards out of the water, without breaking the braille lines 102A.

Figure 1L:
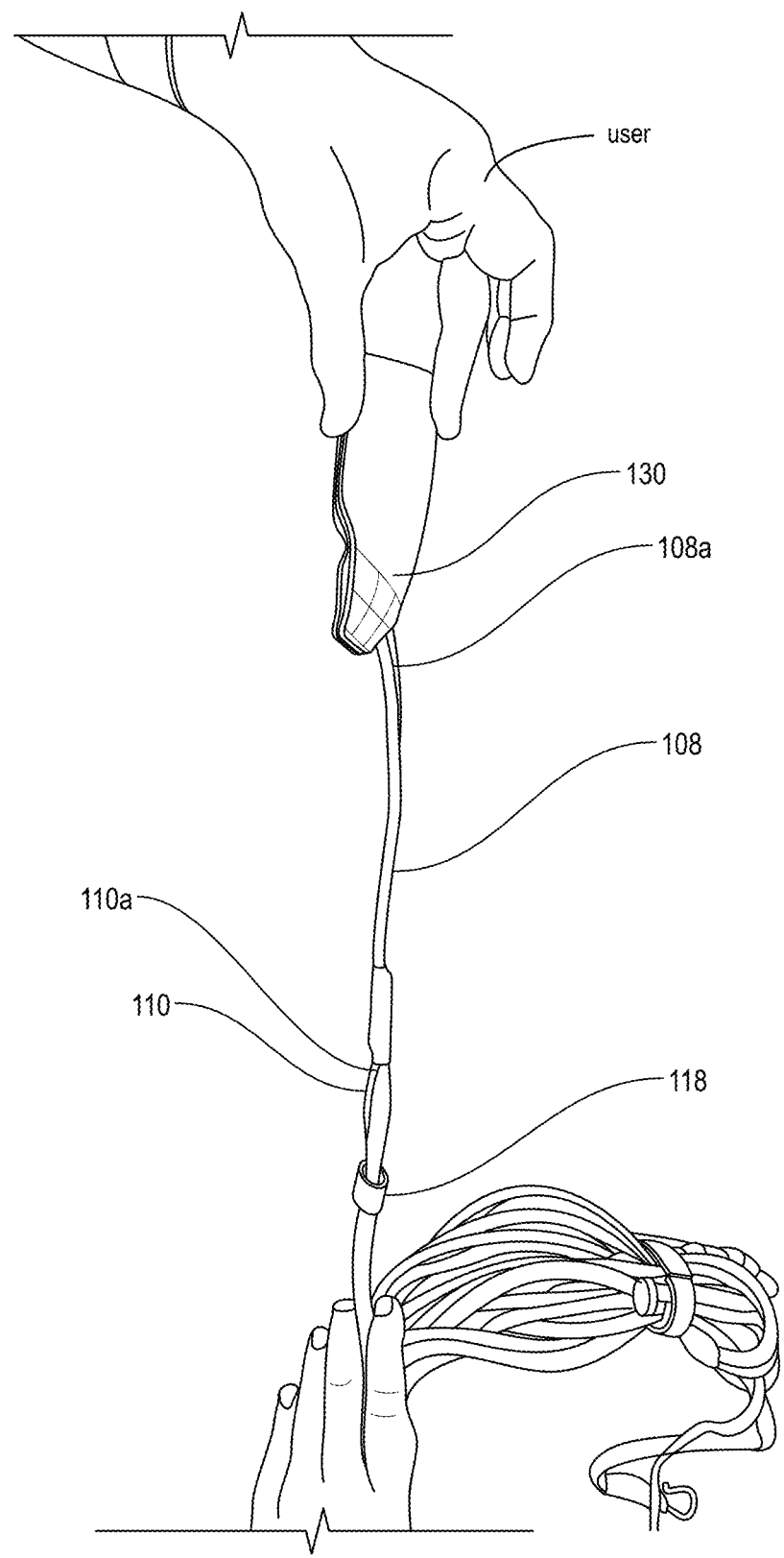
FIG. 1L illustrates a schematic design of arrangement of a proximal end of a horn line fixed to a hand line, in accordance with embodiments of the invention.
Figure 1M:
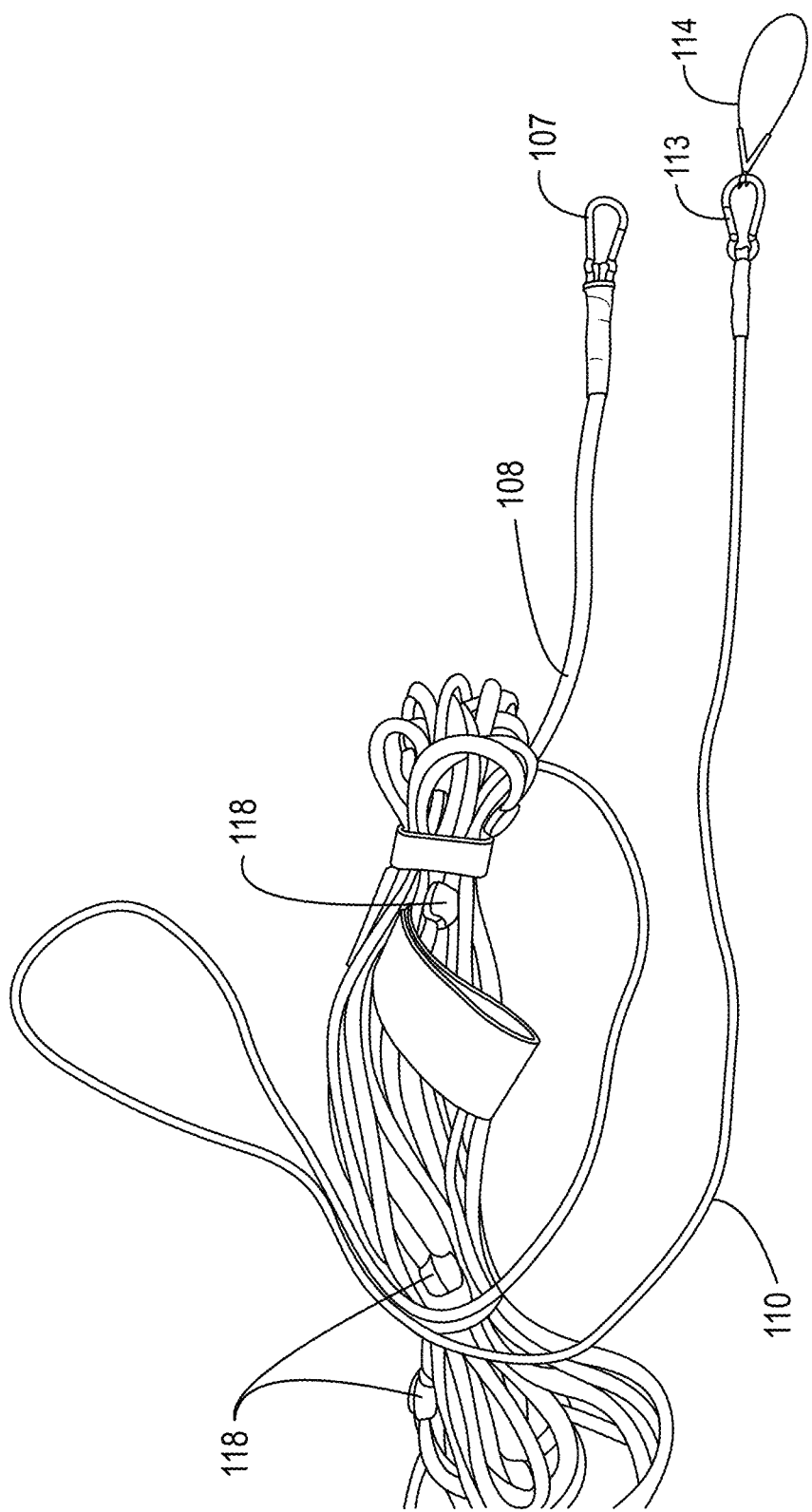
FIG. 1M illustrates a schematic view of arrangement of different connectors on ends of the hand line and the horn line, in accordance with embodiments of the invention.

Referring to FIG. 1K, in one embodiment, at least one coupler 118 defines two adjacent openings, where one opening 118a is a line retainer 118a through which the hand line 108 is extended therethrough, and the line retainer 118a is fixed to a portion 109 of the hand line 108. The other opening 118b is a line passageway 118b through which the horn line 110 operatively extends and engages in a sliding arrangement. In such manner, the horn line 110 is adapted to slide through the at least one coupler 118 by sliding through the line passageway 118b, in the direction of Arrow D, when pulled upon by a user, as illustrated in FIG. 1K. Preferably, all couplers 118 define the two adjacent openings, respectively, including the line retainer 118a and the line passageway 118b. In such embodiment, the respective line retainers 118a of the respective couplers 118 are each fixed to a respective portion 109 of the hand line 108, preferably in a spaced apart relation along the hand line 108. This spaced apart positioning of the couplers 118 along the hand line 108 allows for easy access for a user's hands to grasp the couplers 118 and respective portions of the hand line 108 during the user's retrieval of the cast nest from the body of water. In other word, in a preferred embodiment, the plurality of couplers 118 are respectively fixed to the hand line 108 at spaced apart locations, respectively, preferably spaced 18" apart from each other along the hand line 108, because such preferred spacing can aid the user in pulling and uplifting the hand line 108 when retrieving the cast net out of a body of water. That is because the couplers 118 provide for additional gripping for the user's hands, by providing additional frictional resistance to the hand line 108. Referring to FIG. 1L, in a preferred embodiment, a proximal end 110a of the horn line 110 is fixed to said hand line 108 approximately one foot below an elastic wristband 130 that is attached to a proximal end 108a of the hand line 108, to help keeping the horn line 110 clear of a user's hand grip on the elastic wristband 130. FIG. 1M illustrates a schematic view of arrangement of different connectors on ends of the band line 108 and the horn line 110.

The couplers 118 provide an operative connection between the hand line 108 and the horn line 110. The couplers 118 allow for a smooth transition between an initial pulling of the hand line 108 and a subsequent upward pulling (deploying) of the horn line 110 during retrieval of the cast net body 102 from a snag upon an underwater obstruction. The couplers 118 also ensure a firm and reliable hold by a user's hands on both the hand line 108 and the horn line 110 by providing gripping points for the user. This minimizes the risk of lines slipping loose during the retrieval process.

In one embodiment, the hand line 108 is a strong, durable line specifically designed for withstanding the pulling force exerted during retrieval of the cast net body 102 from the water. The hand line 108 is preferably made of braided nylon or similar material for a good balance of strength and manageability.

In one embodiment, the horn line 110 is a flexible steel cable. In other embodiments, the horn line 110 is fabricated of a flexible material selected from the group consisting of steel cable, braided nylon, and synthetic fiber, and combinations thereof. For a synthetic fiber, the horn line 110 is preferably fabricated of polypropylene, nylon, polyesters (e.g. PET, LCP, Vectran), polyethylene (e.g., Dyneema® and Spectra®), Aramids (e.g., Twaron®, Technora®, and Kevlar®) and/or acrylics (e.g., Dralon®).

Referring to FIG. 1H, the spring-loaded hook 107 that is disposed on the distal end 108b of the hand line 108 is adapted to quickly and securely attach to the swivel 116, at the option of the user.

Since the distal end 110b of the hand line 108 and the distal end 110b of the horn line 110 are removably attachable to the swivel 116 and the central horn 106, respectively, embodiments of the dual line cast net retrieval device 100 can be used with conventional cast nets.

The swivel 116 allows smooth rotation of the hand line 108 relative to the connected braille lines 102C while the hand line 108 is pulled, preventing the net from twisting. Simultaneously, tension on the hand line 108 is evenly distributed across the cast net body 102 through the braille lines 102A. This even distribution helps close the net's pouch efficiently, capturing fish within its confines.

FIG. 1F refers to an illustrative view of an exemplary cast net body 102. Before the retrieval process begins, the cast net body 102 rests on the bottom of the body of water in a fully deployed state. The net webbing 104 of the cast net body 102 is typically made of a lightweight mesh material. In its initial state, the net webbing 104 is fully spread out, creating a large, circular opening designed to capture fish. It rests flat on the bottom, maximizing its coverage area. The braille lines 102A are a series of lines that radiate outwards from the swivel 116 and connect to various points within the net webbing 104. When the cast net body 102 is deployed, the braille lines 102A are relaxed with minimal tension. This allows the net webbing 104 to fully expand and open.

The hand line 108 is pulled by the user to retrieve the cast net body 102. In the initial state, the hand line 108 is also relaxed with minimal tension. It may be coiled or loosely held in the user's hand, ready to be pulled for retrieval.

The lead line 102C is a weighted line that runs along the bottom edge of the net webbing 104. The purpose of the weighted lead line 102c is to help spread open the cast net webbing during deployment by a user over a body of water and to help sink the net quickly in the water. Depending on the specific design, the lead line 102C may be incorporated, and in its initial state, the lead line 102C would also be resting on the bottom with minimal tension.

During retrieval, the user begins pulling the hand line 108. This creates tension that travels through the entire cast net body 102. As the hand line 108 is pulled, the cast net body 102 starts to gather toward the center and then rise from the bottom or ground of the waterbody. Ideally, the net is lifted straight up with minimal tilting, ensuring a centered retrieval. The pulling on the hand line 108 translates to tightening of the braille lines 102A. The braille lines 102A, previously relaxed, become taut as they bear the weight of the net and any captured fish or stone.

The lead line 102C, while still resting on the bottom to some degree, experiences a shape change. As the braille lines 102A are pulled towards the center, the lead line 102C is no longer perfectly circular. Those of ordinary skill in the art can imagine the lead line 102C bunching slightly inwards, following the converging braille lines 102A. If the cast net body 102 is not lifted perfectly centered, some braille lines 102A may experience more tension than others. This can create larger loops in the lead line 102C between the points of connection of the braille lines 102A, potentially snagging on the bottom debris or uneven terrain of the bottom of the waterbody.

FIG. 1G refers to an example scenario where the cast net retrieving device 100 with a horn line 110 and coupler assembly 118 encounters the snag (stone). This occurs, for example, when an underwater obstruction such as a stone becomes lodged in the lead line 102C, which is the weighted edge of the cast nest. Section M specifically highlights the impact and strain on the braille lines 102A resulting from a snag of the net webbing 104 and lead line 102C on the underwater obstruction, the exemplary stone.

Typically, when the lead line 102C is snagged and caught up on an underwater obstruction, two braille lines 102A (called out as "2 Tensioned Braille Lines 102A" in FIGS. 1G and 1n FIG. 1I) become over tensioned because they are pulling on the respective portions of the lead line 102C that is snagged around the underwater obstruction, such as the stone exemplified in FIG. 1G and the broken piling exemplified in FIG. 1I, in effect forming a basket hitch around the stone, thereby preventing the cast net body 102 from being retrieved from the water. That is because a pulling of the hand line 108 and respectively connected braille lines 102A typically causes those two braille lines 102A to be squeezed towards the stone, of which the lead line 102C is wrapped around, as illustrated in FIG. 1I. This suggests these specific braille lines 102A are experiencing the greatest tension as they attempt to pull the lodged stone upwards.

Further, as exemplified in FIG. 1G, all of the other braille lines 102A are relaxed. This indicates that the snag is causing an uneven distribution of force on the two specific braille lines 102A (called out as "2 Tensioned Braille Lines 102A" in FIGS. 1G and 1n FIG. 1I) that are forming the basket hitch, with the lead line 102C, around the underwater obstruction, the stone. Merely pulling harder on the hand line in an upward direction (Arrow U) would only tighten the basket hitch thereby causing the lead line 102C to become more snagged or more stuck on the underwater obstruction. Embodiments of the invention disclosed herein enable the cast net body 102, including net webbing 104, braille lines 102A and lead line 102C, to be freed, or removed from, the underwater obstruction. Through embodiments of the invention disclosed herein, the user can undertake a direct upward pulling on the central horn 106 of the cast net body 102, which alleviate the tension in the two specific braille lines 102A (the "2 Tensioned Braille Lines 102A" in FIGS. 1G and 1n FIG. 1I), which in effect releases the basket hitch otherwise formed, because the central horn 106 is connected to the net webbing Respective portions of the hand line 108 are securely fastened within an opening 118A of each respective coupler 118. Meanwhile, the horn line 110 freely passes through the dedicated opening 118B of each coupler 118. Such embodiments provide for independent manipulation (i.e., pulling) of the hand line 108 relative to the horn line 110 such as during a retrieval of the cast net from the water. These embodiments also provide for independent manipulation (i.e., pulling) of the horn line 110 relative to the hand line 108, for removal of the cast net body 102, or freeing of the cast net body 102, from an underwater obstruction when retrieving the cast net body 102 from the water.

FIG. 1H illustrates a detailed view of the cast net retrieving device 100 with the horn line and coupler assembly. One end of the horn line 110 is attached to the hand line 108. Preferably, each coupler 118 is spaced 19 inches apart, providing a more comfortable grip when raising the cast net body 102.

The horn line 110 extends downward a predetermined distance towards the net webbing 104, forming an intermediate loop before extending upwards towards the central horn 106. The predetermined downward extension of the horn line 110 is approximately half the radius (R in FIG. 1F) of the cast net body 102. For example, if the cast net body 102 has a radius (R in FIG. 1F) of 6 feet, then the intermediate loop may also measure 6 feet. This 6-foot intermediate loop does not affect the normal functions of the cast net body 102.

The hand line 108 is attached to the horn line 110 approximately one foot below the elastic wristband 130, where the elastic wristband 130 is connected to the proximal end 108a of the hand line 108.

FIG. 1I illustrates an example operation of the cast net retrieving device 100 with the horn line 110 and coupler 118 assembly. Typically, when a user finds there to be too much tension on the hand line 108, that is indicative that the net webbing 104 and lead line 102C of the cast net body 102 have become snagged, obstructed or stuck on an object underwater. Applying additional upward pulling force (Arrow U) on the hand line 108 to retrieve the cast net 102 often results in breakage of one of more of the two braille lines 102A. If the cast net body 102 is not free from the snag or obstruction and the user continues to exert such upward pulling force, the braille lines 102C may begin to tear completely off the lead line 102C, leaving the lead line 102C in the water.

Therefore, as the hand line 108 is securely fastened to the designated opening 118A on each coupler 118, the horn line 110 freely passes through the dedicated opening 118B of each coupler 118. This design allows for independent manipulation of the hand line 108 for retrieval, and the horn line 110 for net deployment.

During retrieval, the user begins pulling the hand line 108. This creates tension that travels through the entire cast net body 102. As the hand line 108 is pulled, the cast net body 102 starts to rise from the bottom. Ideally, the net is lifted straight up with minimal tilting, ensuring a centered retrieval. The pull on the hand line 108 translates to tightening of the braille lines 102A. The braille lines 102A, previously relaxed, become taut as they bear the weight of the net and any captured fish or stone. Therefore, using the proposed cast net retrieving device 100, the user is required to pull the horn line 110, causing the cast net body 102 to raise and thereby release the braille lines 102A from the snag.

FIG. 1J illustrates an exemplary elevational view of a coupler 118 connecting the hand line 108 and the horn line 110. A portion of the hand line 110 is fixed inside of the coupler 118 at 118A, as shown in FIG. 1K. Referring to FIG. 1K, the coupler 118 also defines an opening 118B that allows the horn line 110 to operatively slide through it.

FIG. 1K illustrates a partial cut-a-way view of the coupler 118. As depicted, the coupler 118 is preferably designed in a football shape. The coupler 118 has two adjacent openings 118A and 118B. The opening 118A firmly grasps a portion of the hand line 108, preventing the hand line 108 from passing through the opening 118A.

In a preferred embodiment, opening 118A comprises a plurality of internal teeth 119 designed to hold the hand line 108 tightly, by penetrating into respective portions of the hand line 108, as shown in FIG. 1K, preventing any movement through the opening 118A of the respective portion of the hand line 108 that is disposed within the opening 118A. Opening 118B of the coupler 118 preferably includes a smooth internal wall designed to receive the horn line 110 and allow the horn line 110 to pass or move freely through the opening 118B, bidirectionally, as illustrated with Arrow D.

Referring to FIGS. 1G and 1E, when at least one braille line 102A of the plurality of braille lines 102A and the lead line 102C of the cast net body 102 are snagged on an underwater obstruction, such as a stone or broken piling, it can be appreciated by those of ordinary skill in the art that when the disclosed horn line 110 is pulled upward (Arrow U) by a user, that pulling action of the horn line 110 and connected central horn 106 effects an upward pulling upon the central horn 106, which is connected to the net webbing 104, which then imparts tension in the net webbing 104 thereby alleviating and relaxing the tension in the braille lines 102C. Such alleviated tension, or relaxation of the tension, in the braille lines 102C facilitates a loosening up of the otherwise basket hitch that is otherwise formed around the underwater obstruction (by the braille lines 102A and lead line 102C), such that the upwards pulling (Arrow U) of the horn line 108 and connected central horn 106 pulls upward upon the connected net webbing 104 thereby releasing or freeing up the cast net body 102 from the underwater obstruction. In other words, embodiments of the invention enable the user to slide the cast net body 102, including net webbing 104 and lead line 102C, off the underwater obstruction, without breaking the braille lines 102A and without the user needing to enter the water himself or herself.

Referring to FIGS. 2A to 2E, a cast net retrieval device 100 is disclosed comprising a horn hook 120.

Figure 2A:
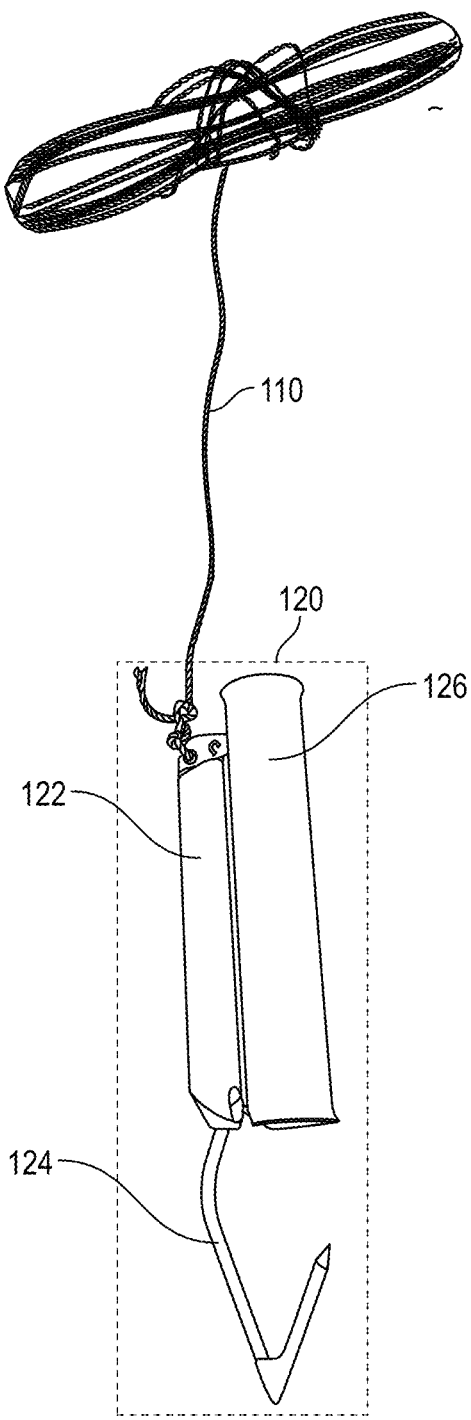
FIGS. 2A to 2D illustrate different perspective views of a cast net retrieval device comprising a horn hook and a horn line, in accordance with embodiments of the invention.
Figure 2B:
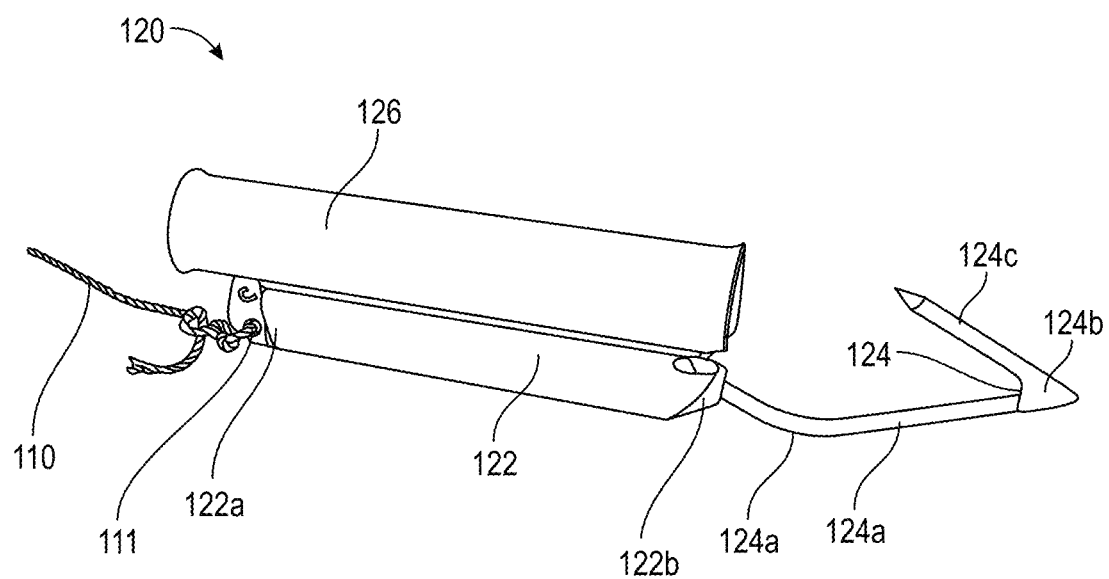
Figure 2C:
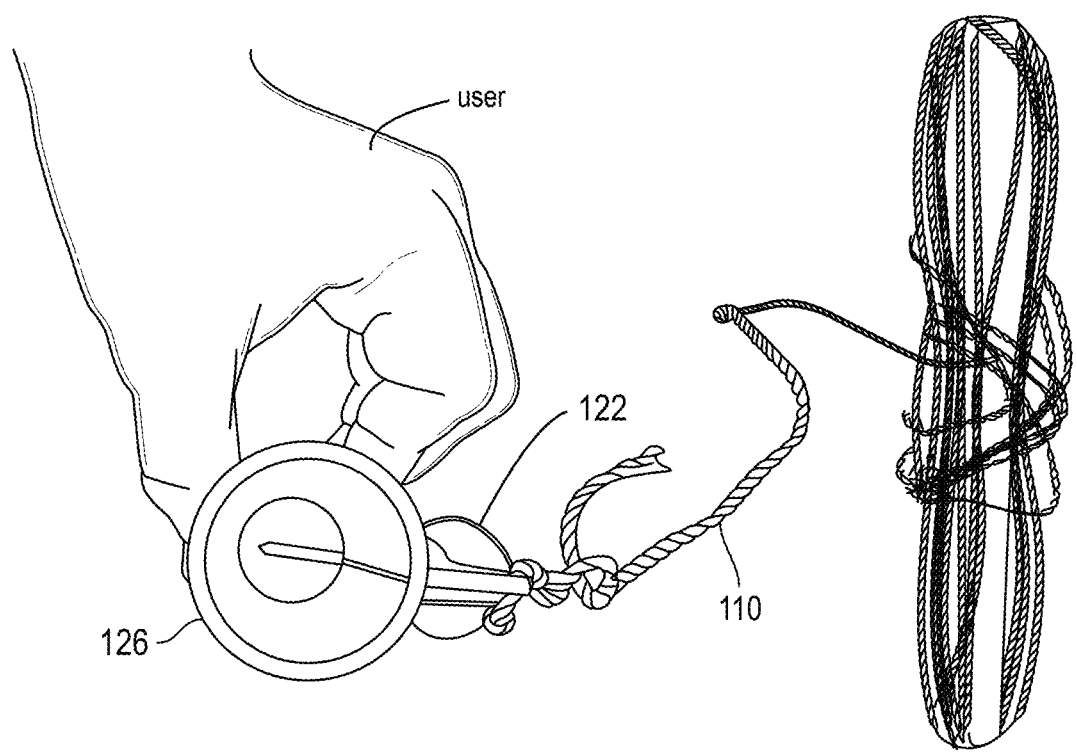
Figure 2D:
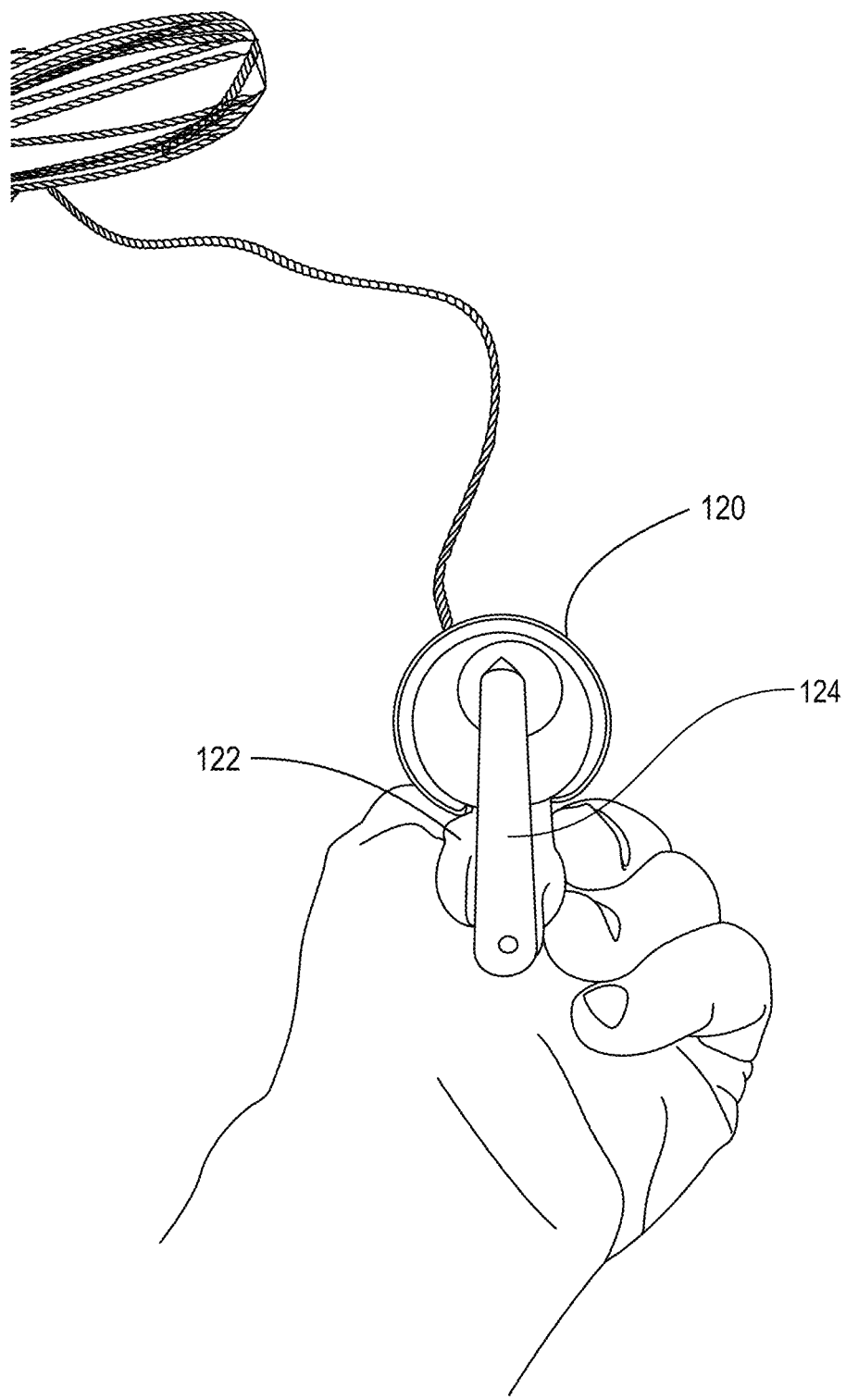

In one embodiment, the horn hook 120 includes an elongated member 122 having a first end 122a opposite a second end 122b, as illustrated in FIGS. 2A-2B. The first end 122a defines an eyelet 111, to which a horn line 110 is connected, and the second end 122b comprises a hook 124.

The horn hook 120 also includes a hollow member 126 that is formed adjacent to the elongated member 122. In one embodiment, the hollow member 126 is welded to the elongated member 122. In another embodiment, the hollow member 126 is integrally formed with the elongated member 122 as a unitary construction.

Figure 2E:
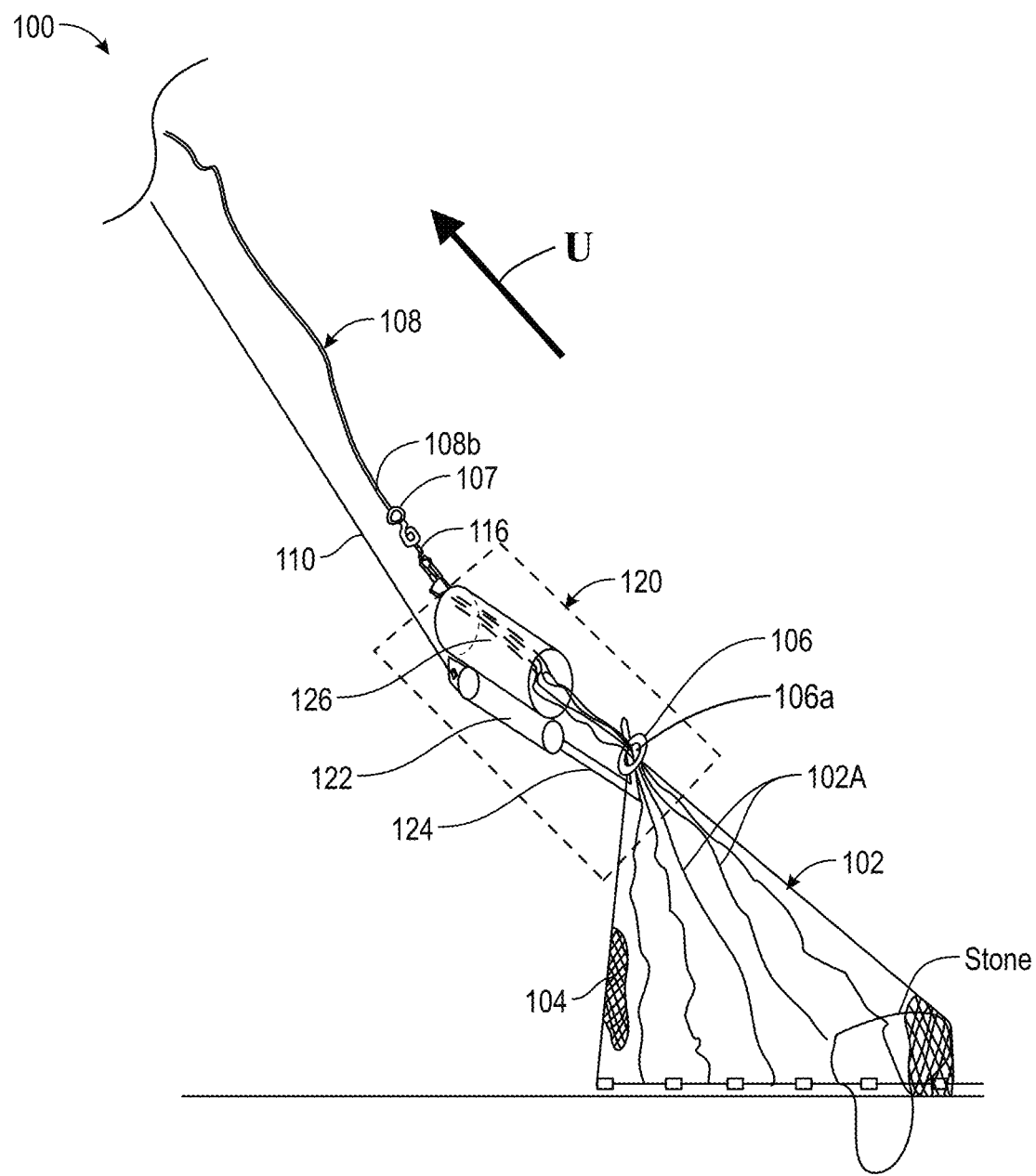
FIG. 2E refers to another embodiment of the cast net retrieving device comprising a horn hook, in accordance with embodiments of the invention.
Figure 2F:
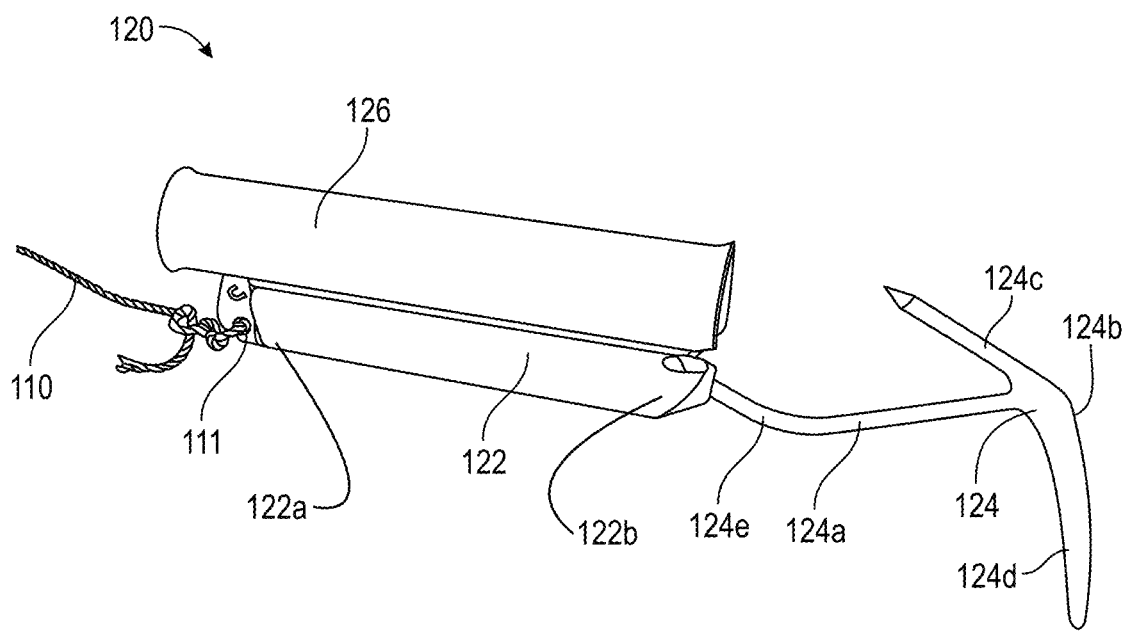
FIG. 2F illustrates a left perspective view of another embodiment of a cast net retrieving device comprising a horn hook, in accordance with embodiments of the invention.
Figure 2G:
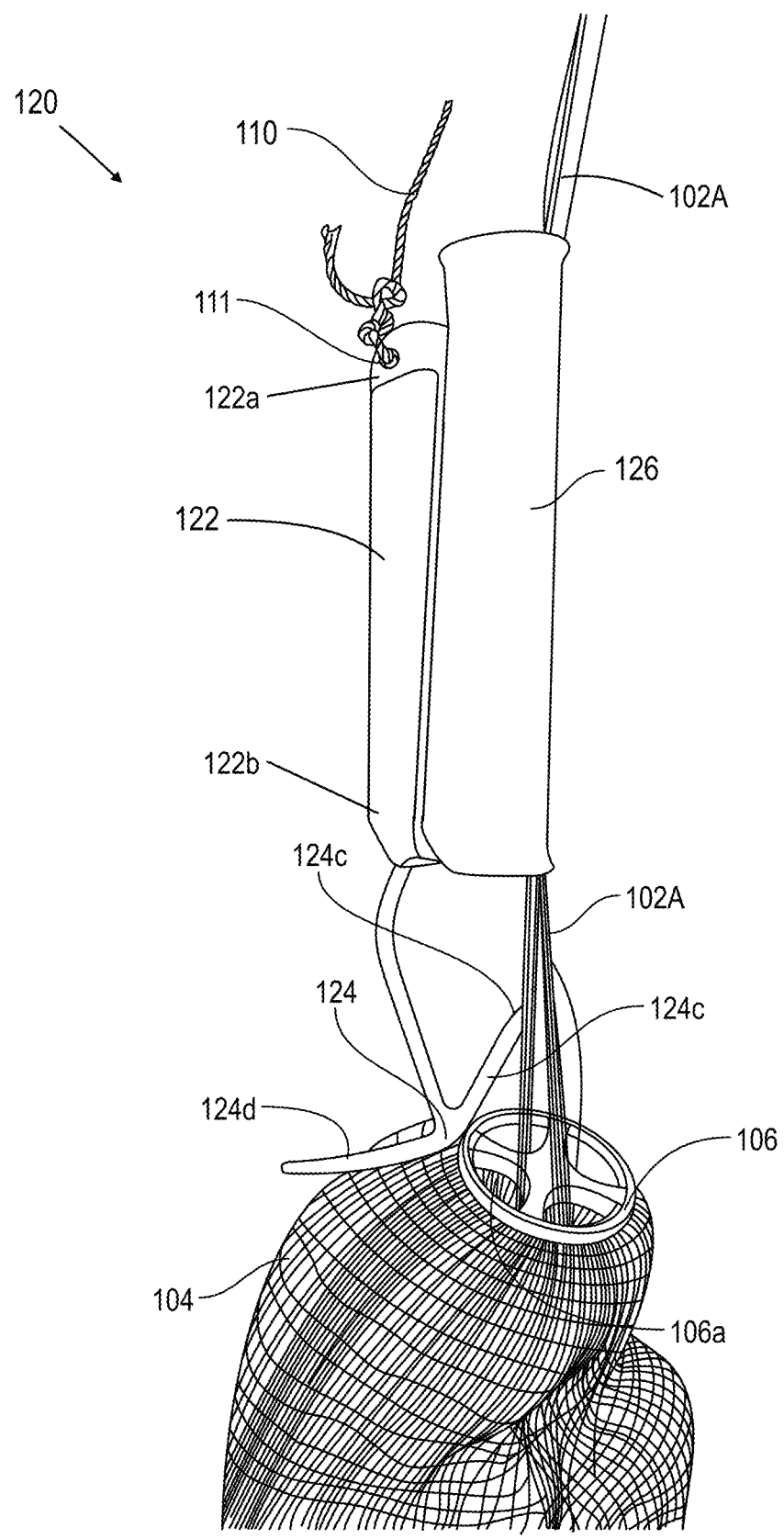
FIG. 2G depicts a partial left side elevational view of the horn hook engaging a net webbing, in accordance with embodiments of the invention.
Figure 2H:
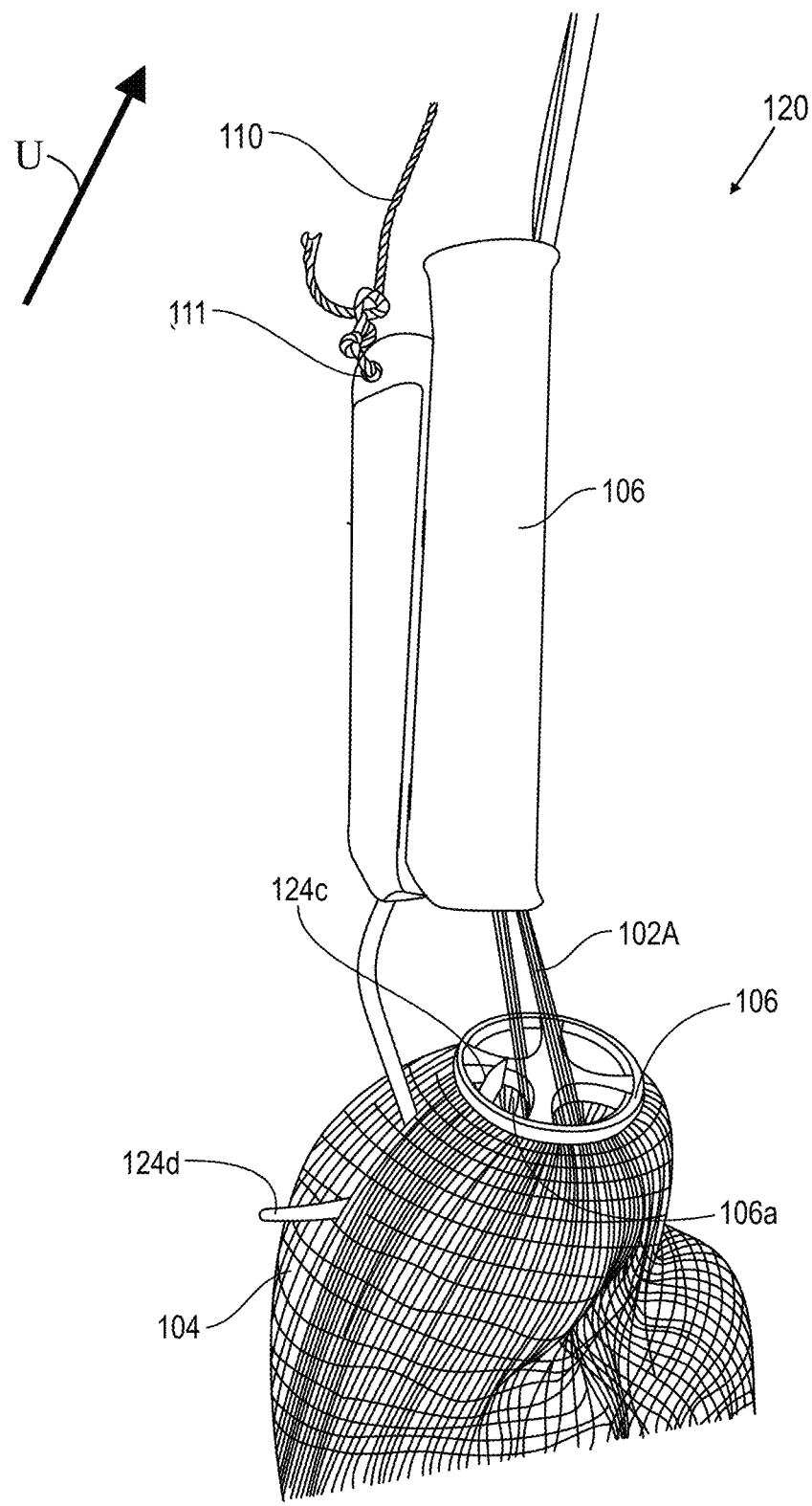
FIG. 2H depicts another partial left side elevational view of the horn hook removably connected to the net webbing of FIG. 2G, in accordance with embodiments of the invention.

The hollow member 126 is adapted to slidingly receive therethrough a hand line 108 of a cast net, as illustrated in FIGS. 2E, 2G, and 2H. As illustrated in FIG. 2E, the horn hook 120 can slide 6 down a hand line 108 and respective braille lines 102A of a cast net, because the hand line 108 and respective braille lines 102A pass through the hollow member 126 of the horn hook 120. As such, the hook 124 of the horn hook 120 is adapted to slidingly engage and removably connect to the central horn 106 of the cast net body 102, as illustrated in FIGS. FIGS. 2E, 2G, and 2H. The horn hook 120 is slidingly engaging the central horn 106 of a cast net in FIG. 2G, and the horn hook 120 is removably connecting to the central horn 106 of the cast net in FIG. 2H.

In other words, upon a deployment of the horn hook 120 along the hand line 108, the hand line 108 and respectively connected braille lines 102C are allowed to pass through the hollow member 126 of the horn hook 120, and the hook 124 of the horn hook 120 can engage and connect to the central horn 106 of the cast net body 102. FIG. 2G provides an exemplary perspective view of the horn hook 120 engaging the central horn 106 and its net webbing 104. FIG. 2H provides an exemplary perspective view of the removable connection of the horn hook 120 to the central horn 106 of the cast net.

Because the horn line 110 is connected to the eyelet 111 of the first end 122a of the elongated member 122 of the horn hook 120, the horn hook 120 is configured to be pulled upwardly by a user, which, when the horn hook 120 is connected to the central horn of a cast net body 102, such upward pulling of the horn line 110 by the user thereby imparts a respective upward pulling force (Arrow U in FIG. 2E and FIG. 2H) upon the central horn 106 of the cast net.

As can be seen in FIG. 2E, the horn line 110 is adapted to impart an uplifting force (Arrow U in FIG. 2E and FIG. 2H) upon the central horn 106 and to the net webbing 104 fixed to the central horn 1067, upon a horn line pulling by the user in the direction of Arrow U when the hook 124 of the horn hook 120 is removably connected to the central horn 106. As detailed above, this uplifting force imparted upon the central horn 106 alleviates tension in the braille lines 102A, which facilitates retrieval of the cast net when the weighted lead line 102C and/or net webbing 104 is snagged upon an underwater obstruction.

Referring to FIGS. 2F-2H, in a preferred embodiment, the hook 124 of the horn hook 120 comprises a hook shank 124a, a hook bend 124b, a hook catch 124c, and a net deflector 124d. The hook bend 124b is disposed at a distal end of the hook shank 124a. The hook catch 124c extends from the hook bend 124b at an acute angle to the hook shank 124a. The net deflector 124d extends from the hook bend 124b at an obtuse angle to the hook shank 124a, as illustrated in FIG. 2F.

As exemplified in FIG. 2G, the net deflector 124d is configured to deflect the net webbing 104 upon a deployment of the horn hook 120 down the hand line 108, to facilitate engagement of the hook catch 124c with the central horn 106 of the cast net body 104. As can be seen, the net deflector 124c prevents the hook bend 124b from getting caught in the net webbing 104. If the hook bend 124b gets caught in the net webbing 104, that can sometimes prevent the hook catch 124c from reaching far down enough to get underneath the central horn 106; and thus the net deflector helps to prevent the hook bend 124b from getting caught in the net webbing 104. In other words, the net deflector 124d deflects the net webbing out of the way when the horn hook 120 is deployed. As such, the hook deflector 124d aids the hook 124 in successfully engaging the central horn 106, because the hook catch 124c can reach far down enough to get underneath the central horn 106, such that an upward pulling of the horn hook 120 would force the hook catch 124c to engage and removably connect to the central horn 106 of the cast net body 102.

In a preferred embodiment, the hollow member 126 of the horn hook 120 comprises a cylindrical body, as illustrated in FIGS. 2B-2G, for example, having a round cross-section. In another embodiment, the hollow member 126 comprises a hollow body having a square cross-section or a rectangular cross-section. The hollow member 126 preferably has a length of 8 inches and a diameter of 1.5 inches.

The elongated member 122 of the horn hook 120 preferably comprises an elongated weighted body, and the weighted body member 122 preferably has a weight of 2 lbs. In a preferred embodiment, a length of the elongated member 122 is 6.5 inches. In a preferred embodiment, the elongated weighted body member 122 comprises a cylindrical body having a diameter of 1 inch. It is important for the elongated member 122 to have a weight that exceeds a weight of the hollow member 126, because the heavier weight of the elongated member 122 helps to keep the connected hook 124 of the horn hook 120 positioned downwardly when the horn hook 120 is deployed down a hand line 108 toward a central horn 106, analogous to how a weighted keel of a vessel helps to keep a rudder of a vessel positioned downward in water.

Referring to FIG. 2E, when at least one braille line 102A of the plurality of braille lines 102A and the lead line 102C of the cast net body 102 are snagged on an underwater obstruction, such as a stone or broken piling, it can be appreciated by those of ordinary skill in the art that when the disclosed horn line 110 is pulled upward (Arrow U) by a user, that pulling action of the horn line 110 and connected horn hook 124 effects an upward pulling upon the central horn 106, which is connected to the net webbing 104, which then imparts tension in the net webbing 104 thereby alleviating and relaxing the tension in the braille lines 102C. Such alleviated tension, or relaxation of the tension, in the braille lines 102C facilitates a loosening up of the otherwise basket hitch that is otherwise formed around the underwater obstruction (by the braille lines 102A and lead line 102C), such that the upwards pulling (Arrow U) of the horn line 108 and horn hook 124, which is removably connected to the central horn 106, pulls upward upon the central horn 106 and connected net webbing 104 thereby releasing or freeing up the cast net body 102 from the underwater obstruction. In other words, embodiments of the invention enable the user to slide the cast net body 102, including net webbing 104 and lead line 102C, off the underwater obstruction, without breaking the braille lines 102A and without the user needing to enter the water himself or herself.

Referring to FIGS. 3A-3E, a cast net retrieving device 100 is disclosed comprising a hand line 108 including a tube joint 128 embedded within the hand line 108, and the cast net retrieving device 100 includes a horn line 110 extending through the tube joint 128. In a preferred embodiment, the hand line 108 defines a channel within which the tube joint 128 is disposed, through a majority of a length of the hand line 108, as further detailed below.

In one embodiment, the cast net retrieving device 100 includes a cast net body 102 having a central horn 106 connected to the net webbing 104. The net webbing 104 has a weighted lead line 102C at a distal end thereof, and the cast net body 102 is adapted to be thrown by a user into a water body for fishing.

The hand line 108 has a proximal end 108a opposite a distal end 108b. The proximal end 108a of the hand line 108 is illustrated in FIGS. 3B-3C. The distal end 108b of the hand line 108 is illustrated in FIG. 3A and FIG. 3D.

Figure 3A:
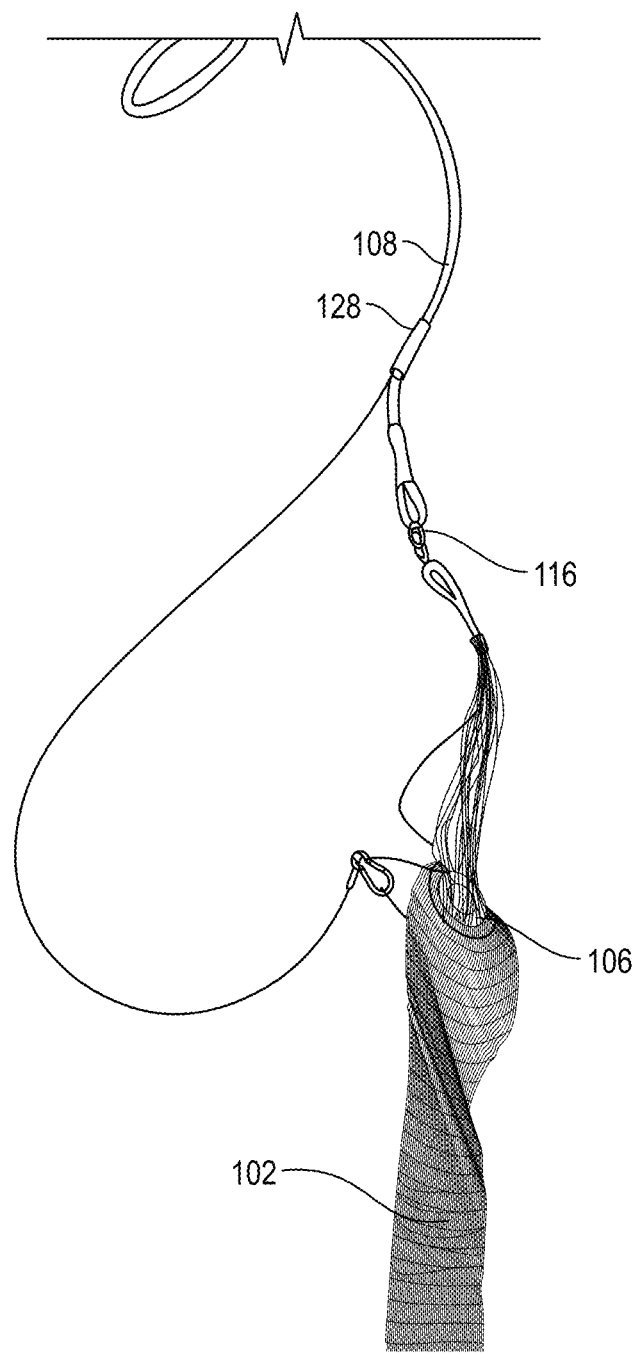
FIG. 3A refers to another embodiment of the cast net retrieving device with a tube joint, in accordance with embodiments of the invention.
Figure 3B:
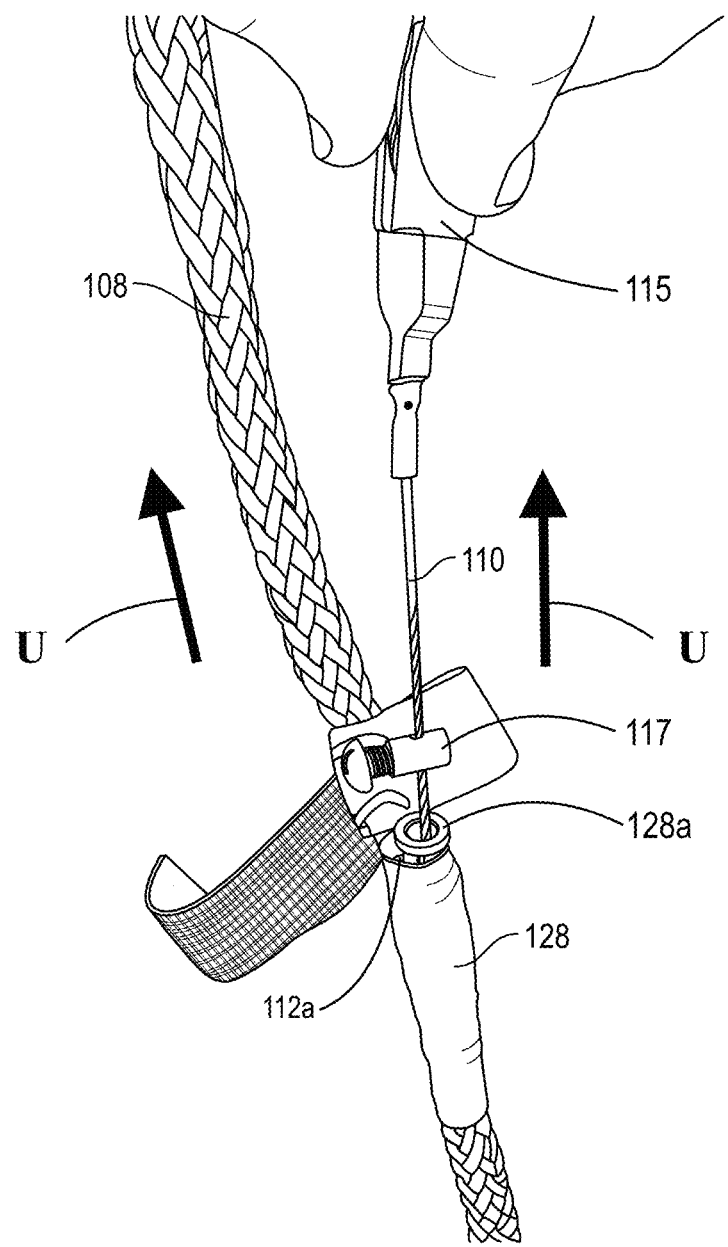
FIG. 3B refers to a schematic view of a pulling action of the horn line from the tube joint, in accordance with embodiments of the invention.
Figure 3C:
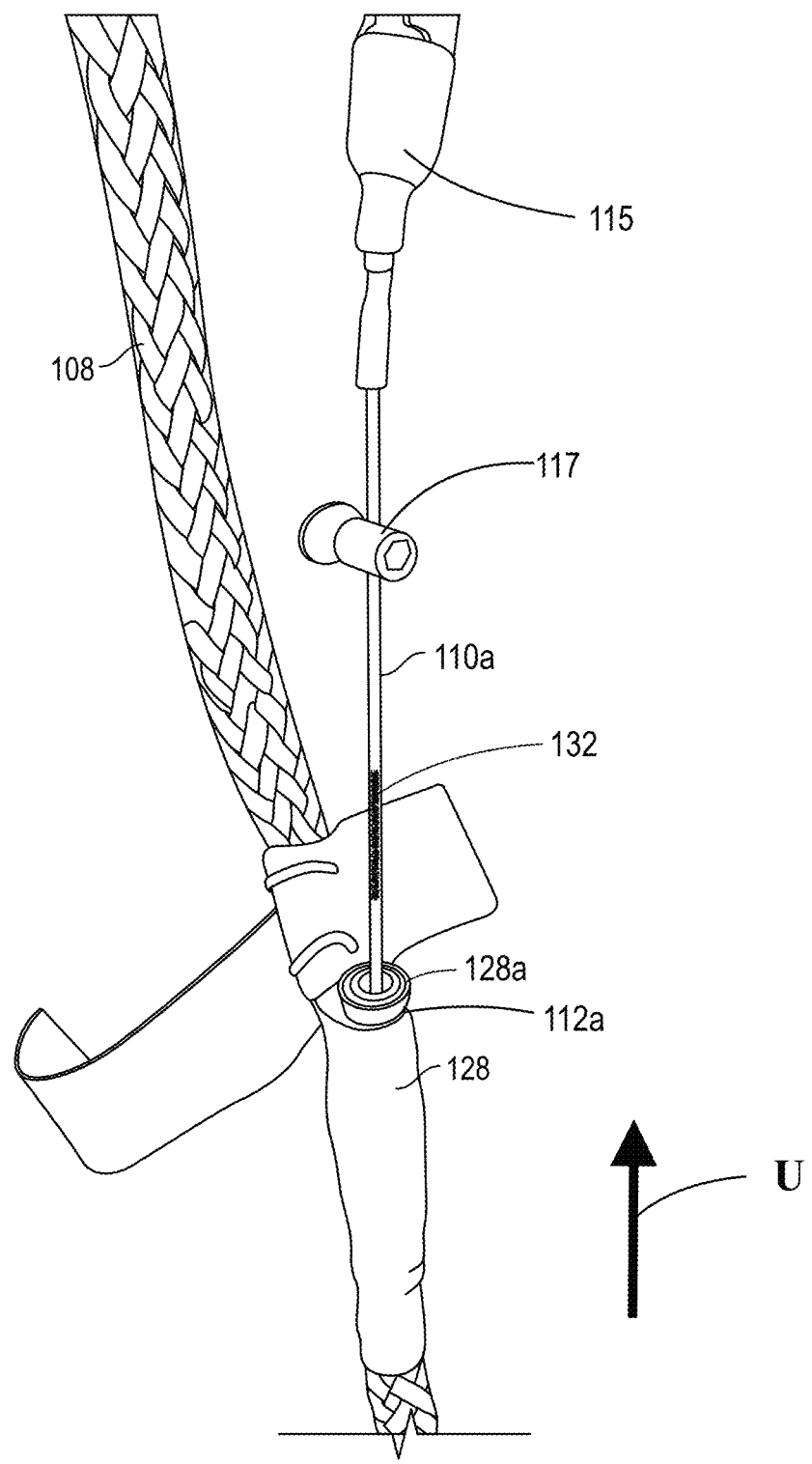
FIG. 3C refers to another schematic view of a pulling action of the horn line from the tube joint, in accordance with embodiments of the invention.
Figure 3D:
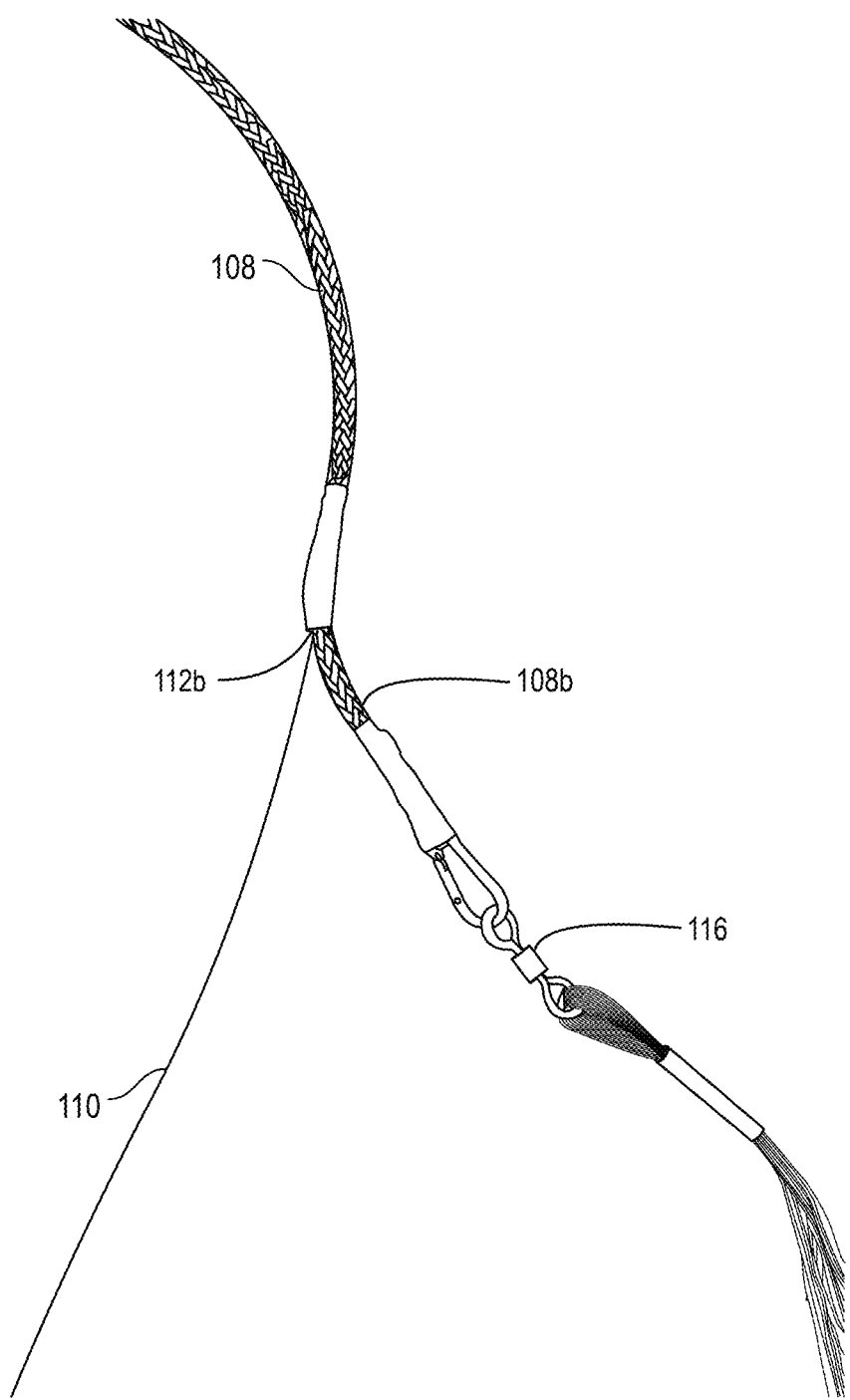
FIG. 3D refers to another schematic view of an extended view of the horn line, in accordance with embodiments of the invention.

As illustrated in FIG. 3D, in a preferred embodiment, the distal end 108b of the hand line 108 is removably connected to a swivel 116 of the cast net body 102. The swivel 116 is operatively connected to a plurality of braille lines 102A that slidably extend through a central horn 106 of the cast net body 102. The plurality of braille lines 102A have respective distal ends connected to the weighted lead line 102C.

As illustrated in FIGS. 3A-3D, in a preferred embodiment, the cast net retrieving device 100 includes the tube joint 128 that is embedded within the hand line 108. The tube joint 128 has a proximal end 128a positioned at a first aperture 112a of the hand line 108, and the first aperture 112a is defined by a proximal end 108a of the hand line 108, as shown in FIG. 3B and FIG. 3C.

The tube joint 128 has a distal end 128b positioned at a second aperture 112b of the hand line 108, and the second aperture 114 of the hand line 108 is defined by a distal end 108b of the hand line 108, as shown in FIG. 3A and FIG. 3D.

Figure 3E:
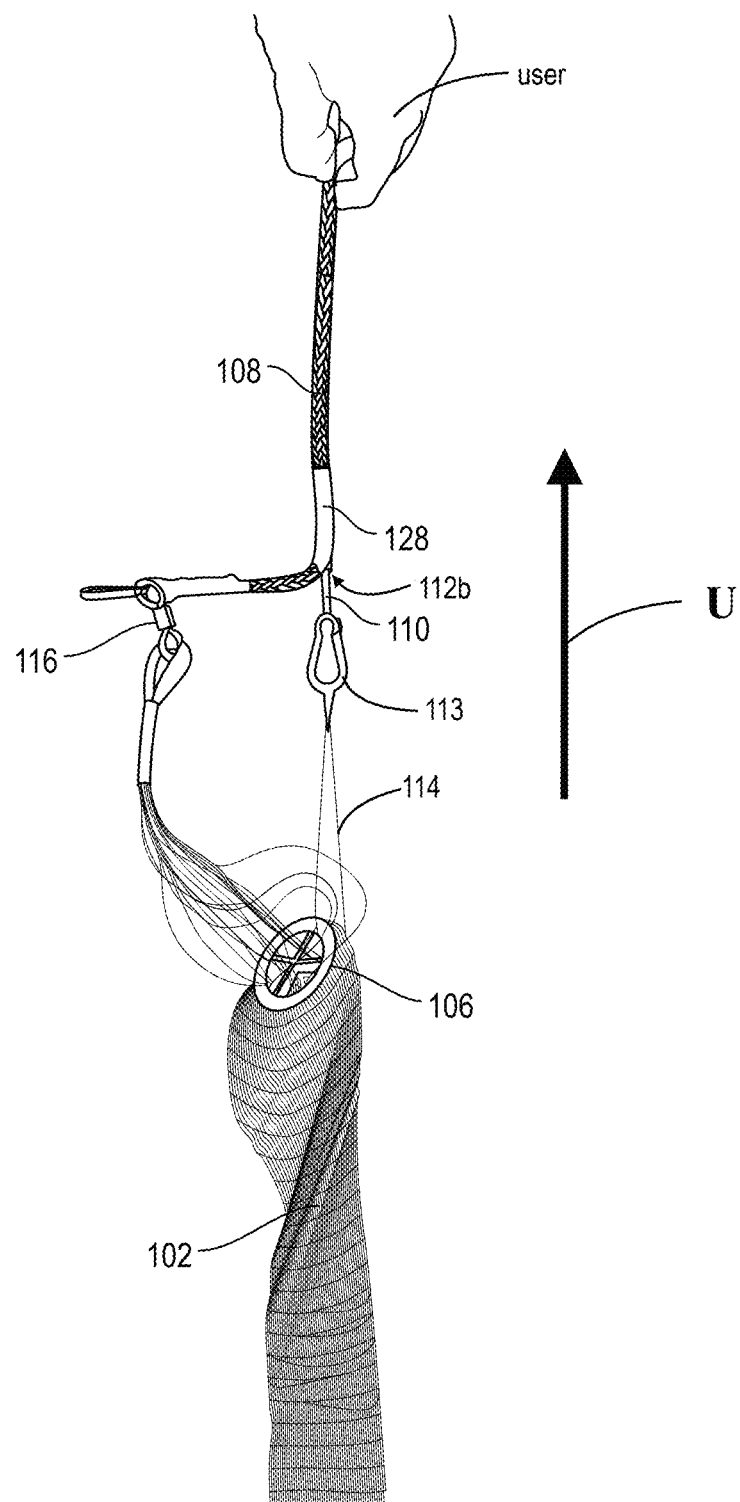
FIG. 3E refers to another schematic view of a pulling action of the horn line and respective net webbing of the cast net body, in accordance with embodiments of the invention.

In a preferred embodiment, the tube joint 128 extends from the proximal end 108a of the hand line 108, as shown in FIGS. 3B-3C, to the distal end of the hand line 108, as shown in FIG. 3A, FIG. 3D and FIG. 3E.

The horn line 110 has a proximal end 110a opposite a distal end 110b. The horn line 110 is operatively disposed within the tube joint 128, as exemplified in FIGS. 3B-3C. The proximal end 110a of the horn line 110 extends outwardly from the tube joint 128 at the first aperture 112a. The distal end 110b of the horn line 110 extends outward of the tube joint 128 at the second aperture 112b, as illustrated in FIGS. 3D-3E, and the distal end 110b of the horn line can removably connect to the central horn 106 of the cast net body 102.

In one embodiment, the horn line 110 is connected to the central horn 106 through a basket hitch connector 114, as illustrated in FIG. 3E. The basket hitch connector 114 forms a loop around the central horn, and ends of the basket hitch connector 114 are connected to a horn line clasp 113 of the horn line 110.

In one embodiment, a length of the horn line 110 is at least 1 foot greater than a length of the hand line 108. In a preferred embodiment, a length of the horn line 110 is greater than a length of the hand line 108 by a length equal to a radius (R in FIG. 1F) of the net webbing of the cast net body. In a preferred embodiment, a preferred length of the horn line 110 is longer than a length of the hand line 108 by a length that is equal to (or longer than) a length of a radius (R) of the cast net, as illustrated in FIG. 1F. For example, a 6-foot cast net can a radius (R) of 6 feet, which is the distance from the central horn 106 to the lead line 102C. When opened, the net will unfold into a circle that is 12 feet across in diameter, which is twice the radius (R). Thus, in this example, in a preferred embodiment, a length of the horn line 110 is longer than a length of the hand line 108 by a length that is equal to 6 feet, because that is the length of the radius of the cast net, in this illustrative example.

Referring to FIG. 3C, in a preferred embodiment, the horn line 110 comprises a colored marker near a proximal end 110a thereof. The colored marker is indicative of a length of horn line 110 sufficiently pulled out of the first aperture 112a adapted to indicate alleviated tension in the braille lines 102A.

FIG. 3D provides an exemplary view of the distal end 110b of the horn line extending outwardly from the second aperture 112b of the hand line 108. The horn line 110 is extended outwardly from the tube joint 128 at the distal end 108b of the hand line 108.

In a preferred embodiment, the horn line 110 is a flexible steel cable. In other embodiments, the horn line 110 is fabricated of a flexible material selected from the group consisting of steel cable, braided nylon, and synthetic fiber, and combinations thereof. For a synthetic fiber, the horn line 110 is preferably fabricated of polypropylene, nylon, polyesters (e.g. PET, LCP, Vectran), polyethylene (e.g., Dyneema® and Spectra®), Aramids (e.g., Twaron®, Technora®, and Kevlar®) and/or acrylics (e.g., Dralon®).

A handle 115 is preferably connected to the proximal end 110a of the horn line 110, as illustrated in FIG. 3B and FIG. 3C. The handle 115 is preferably sized and configured to be grasped by a hand of the user.

In one embodiment, a marker indicator 132 is included near the distal end 110a of the horn line 110, as shown in FIG. 3C. The marker indicator 132 provides the user with a visual point of reference, such that the user can see how much length of horn line 110 has been pulled by the user, outward of the tube joint and respective hand line 108, as shown in FIG. 3C. For example, when the user pulls the horn line 110 sufficiently out of the distal end 128a of the tube joint 128, the marker indicator 132 is then visually revealed to the user, as illustrated in FIG. 3C (because it is located on a surface of a portion of the horn line 110 that was previously embedded inside of the tube joint 128); and the marker indicator 132 visually indicates to the user that a sufficient length of horn line 110 has been pulled such that the braille lines 102A are now at a relaxed state because adequate tension has been alleviated from the braille lines 102A as a result of the user's pulling sufficiently on the horn line 110.

In one embodiment, a clamp 117 is operatively connected near the proximal end 110a of the horn line 110; and the clamp 117 is preferably a spring-loaded clamp 117 that is operatively connected near the proximal end 110a of the horn line 110, as illustrated in FIG. 3B and FIG. 3C. As shown, the horn line 110 is threaded through the spring-loaded clamp 117. The spring-loaded clamp 117 is moveable from a clamped engagement upon the horn line 110 to an unclamped engagement upon the horn line 110. In the unclamped engagement, the horn line 110 is able to slide through the spring-loaded clamp 117. In the clamped engagement, the horn line 110 is not able to move through the spring-loaded clamp 117, because the spring-loaded clamp 117 is then clamped onto the horn line 110, gripping it in a firm engagement.

In a preferred embodiment, when the spring-loaded clamp 117 is positioned in the clamped engagement of the horn line 100, the horn line 110 can be pulled by the user in tandem with the hand line 108, because the clamp 117 cannot pass through the proximal end 128a of the tube joint 128. As such, the horn line 110 is pullable upon a pulling of the hand line 108 by the user.

The horn line 110 is adapted to exert an uplifting force upon the central horn 106 and the connected net webbing 104, upon a horn line pulling by the user through the tube joint 128 and respective hand line 108. The uplifting force is configured to alleviate tension in the braille lines when the weighted lead line and/or net webbing is snagged upon an underwater obstruction.

FIG. 3B refers to a schematic view of a pulling action (Arrow U) of the horn line 110 upwardly through the tube joint 128, as it is pulled upwardly by a user. In a similar nature to the description above regarding the effect of an upward pulling upon a central horn 106 releasing a snagged cast net boy 102 from an underwear obstruction, in this embodiment, the horn line 108 is pulled by a user through the tube joint 128 that is embedded within the hand line 108, to exert an upward pulling force upon the central horn 106 to which the distal end 108b of the horn line 108 is connected, in order to free up or release a cast net body 102 from an underwater obstruction.

Because the horn line 110 can move freely inside of the tube joint 128, the horn line 110 provides the user with control over the central horn 106, because the horn line 110 is adapted to pull upwardly upon the central horn 106 to which the horn line 110 is connected, as illustrated in FIG. 3E. The upward pulling on the central horn 106 by the horn line 110 relaxes tension in the braille lines 102A (as described above). As noted above, the distal end 110b of the horn line 110 is preferably connected to the central horn 106 with a basket hitch connector, as illustrated in FIG. 3E, which exemplifies the upward pulling force (Arrow U) of the horn line 110 acting upon the central horn 106 and respective net webbing 104 of the cast net body 102. As can be appreciated from this disclosure, the upward pulling force upon the disclosed horn line 110 and connected central horn 106 imparts an upward pulling force upon the net webbing 104 that is connected to the central horn 106, thereby releasing the net webbing 106 and lead line 102C from the underwater obstruction. In other words, the net webbing 104 and lead line 102C can slide off the underwater obstruction, releasing the cast net body 102 form the snag, without breaking the braille lines 102A and without the user needing to enter the water, through embodiments of the disclosed invention.

FIG. 3C refers to an exemplary view of the upward pulling action (Arrow U) of the horn line 110 through the embedded tube joint 128 by the user, where the horn line 110 is extended from the tube joint 128 when pulled by the user.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., upper, lower, third, etc.) is for distinction and not counting. For example, the use of "third" does not imply there must be a corresponding "upper" or "lower." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an device or system or a component of an device or system being adapted to, arranged to, capable of, configured to, enabled to, operable to, or operative to perform a particular function encompasses that device, system, or component, whether or not it or that particular function is activated, turned on, or unlocked, as long as that device, system, or component is so adapted, arranged, capable, configured, enabled, operable, or operative.

The invention claimed is:

1. A cast net retrieving device, comprising:
  a cast net body having a central horn connected to a net webbing having a weighted lead line at a distal end thereof, wherein said cast net body is adapted to be thrown by a user into a water body for fishing;
  a hand line having a proximal end opposite a distal end, said distal end connected to a swivel, said swivel connected to a plurality of braille lines slidably extending through 8 said central horn of the cast net body, the plurality of braille lines having respective distal ends connected to the weighted lead line; and
  a horn line having a proximal end opposite a distal end, said horn line operatively connected to said hand line through a plurality of couplers, wherein at least one coupler of the plurality of couplers defines a line retainer and defines a line passageway adjacent the line retainer, the line retainer being fixed to a portion of the hand line extending therethrough, the line passageway operatively slidably receiving the horn line therethrough in a sliding engagement,
  said distal end of the horn line connected to said central horn of said cast net body, the horn line adapted to exert an uplifting force upon the central horn and the connected net webbing, upon a horn line pulling by the user through the plurality of couplers, said uplifting force configured to alleviate tension in said braille lines when the weighted lead line is snagged upon an underwater obstruction.

2. The cast net retrieving device of claim 1, further comprising a basket hitch connector, wherein said horn line is removably connected to the central horn through the basket hitch connector.

3. The cast net retrieving device of claim 2, wherein said basket hitch connector forms a loop around said central horn, wherein respective ends of said basket hitch connector are each connected to a horn line clasp removably connected to the distal end of said horn line.

4. The cast net retrieving device of claim 1, wherein said proximal end of said horn line is fixed to said hand line approximately one foot below an elastic wristband that is attached to the proximal end of said hand line.

5. The cast net retrieving device of claim 1, further comprising a spring-loaded hook removably connecting the horn line to the swivel.

6. The cast net retrieving device of claim 1, wherein a length of the horn line is at least one foot greater than a length of the hand line.

7. The cast net retrieving device of claim 1, wherein a length of the horn line is greater than a length of the hand line by a length equal to a radius of the net webbing of the cast net body.

8. A cast net retrieving device, comprising:
  a hand line having a proximal end opposite a distal end, said distal end adapted to removably connect connected to a swivel, said swivel operatively connected to a plurality of braille lines slidably extending through a central horn of a cast net body, wherein the plurality of braille lines having respective distal ends connected to a weighted lead line; and
  a horn line having a proximal end opposite a distal end, said horn line operatively connected to said hand line through a plurality of couplers, wherein at least one coupler of the plurality of couplers defines a line retainer and defines a line passageway adjacent the line retainer, the line retainer being fixed to a portion of the hand line extending therethrough, the line passageway operatively slidably receiving the horn line therethrough in a sliding engagement,
  said distal end of the horn line adapted to connect to the central horn of the cast net body, the horn line adapted to exert an uplifting force upon the central horn and the connected net webbing, upon a horn line pulling by the user through the plurality of couplers, said uplifting force configured to alleviate tension in said braille lines when the weighted lead line is snagged upon an underwater obstruction.

9. The cast net retrieving device of claim 8, further comprising a basket hitch connector disposed at a distal end of the horn line, said basket hitch connector adapted to removably connect to the central horn of the cast net body.

10. The cast net retrieving device of claim 8, wherein said proximal end of said horn line is fixed to said hand line approximately one foot below an elastic wristband fixed to proximal end of said hand line.

11. The cast net retrieving device of claim 8, wherein a length of the horn line is at least one foot greater than a length of the hand line.

12. The cast net retrieving device of claim 8, wherein a length of the horn line is greater than a length of the hand line by a length equal to a radius of the net webbing of the cast net body.

* * * * *